US010953390B2

(12) United States Patent
Maehama et al.

(10) Patent No.: US 10,953,390 B2
(45) Date of Patent: Mar. 23, 2021

(54) CHA-TYPE ZEOLITE AND METHOD FOR PRODUCING THE SAME

(71) Applicant: TOSOH CORPORATION, Yamaguchi (JP)

(72) Inventors: Seiji Maehama, Yamaguchi (JP); Hidekazu Aoyama, Yamaguchi (JP); Satoshi Nakamura, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 158 days.

(21) Appl. No.: 16/302,964

(22) PCT Filed: May 23, 2017

(86) PCT No.: PCT/JP2017/019183
§ 371 (c)(1),
(2) Date: Nov. 19, 2018

(87) PCT Pub. No.: WO2017/204212
PCT Pub. Date: Nov. 30, 2018

(65) Prior Publication Data
US 2019/0143309 A1 May 16, 2019

(30) Foreign Application Priority Data
May 23, 2016 (JP) ............................. JP2016-102181

(51) Int. Cl.
*C01B 39/48* (2006.01)
*B01J 29/70* (2006.01)
*B01D 53/94* (2006.01)

(52) U.S. Cl.
CPC ........... *B01J 29/7015* (2013.01); *C01B 39/48* (2013.01); *B01D 53/9418* (2013.01);
(Continued)

(58) Field of Classification Search
CPC .......................... C01B 39/48; B01J 29/7015
See application file for complete search history.

(56) References Cited

U.S. PATENT DOCUMENTS 4,544,538 A    10/1985   Zones
7,597,874 B1   10/2009   Miller et al.
(Continued)

FOREIGN PATENT DOCUMENTS

JP    2007-534582    11/2007
JP    2014-530797    11/2014
(Continued)

OTHER PUBLICATIONS

Zones et al, "Templates in the Transformation of Zeolites to Organozeolites" Novel Materials in Heterogeneous Catalysis Chapter 2pp 14-24 (1990) (Year: 1990).*
(Continued)

*Primary Examiner* — David M Brunsman
(74) *Attorney, Agent, or Firm* — Greenblum & Bernstein, P.L.C.

(57) ABSTRACT

A CHA-type zeolite has a molar ratio of silica to alumina of 10.0 or more and less than 20.0 and a molar ratio of silanol groups to silicon of $0.15 \times 10^{-2}$ or more and $0.50 \times 10^{-2}$ or less, a molar ratio of silica to alumina of 20.0 or more and 35.0 or less and a molar ratio of silanol groups to silicon of $0.15 \times 10^{-2}$ or more and $1.10 \times 10^{-2}$ or less, a molar ratio of silica to alumina of more than 35.0 and 45.0 or less and a molar ratio of silanol groups to silicon of $0.15 \times 10^{-2}$ or more and $1.65 \times 10^{-2}$ or less, or a molar ratio of silica to alumina of more than 45.0 and 55.0 or less and a molar ratio of silanol groups to silicon of $0.15 \times 10^{-2}$ or more and $1.80 \times 10^{-2}$ or less.

21 Claims, 5 Drawing Sheets

(52) U.S. Cl.
CPC ...... *B01D 2255/50* (2013.01); *C01P 2002/02* (2013.01); *C01P 2002/72* (2013.01); *C01P 2004/03* (2013.01); *C01P 2004/45* (2013.01)

(56) References Cited

U.S. PATENT DOCUMENTS

| | | | |
|---|---|---|---|
| 7,670,589 | B2 | 3/2010 | Cao et al. |
| 7,754,187 | B2 * | 7/2010 | Cao .......................... B01J 29/80 |
| | | | 423/703 |
| 7,772,335 | B1 * | 8/2010 | Cao ..................... B01J 29/7015 |
| | | | 526/75 |
| 9,636,667 | B2 * | 5/2017 | Feyen ..................... B01J 29/67 |
| 10,315,924 | B2 * | 6/2019 | Feyen ..................... C01B 39/48 |
| 10,512,905 | B2 * | 12/2019 | Rivas-Cardona ........................... |
| | | | B01D 53/8628 |
| 2005/0197520 | A1 | 9/2005 | Mertens et al. |
| 2011/0251048 | A1 | 10/2011 | Ariga et al. |
| 2013/0280160 | A1 | 10/2013 | Ariga et al. |
| 2013/0323164 | A1 | 12/2013 | Feyen et al. |
| 2014/0147378 | A1 | 5/2014 | Davis et al. |
| 2015/0284255 | A1 | 10/2015 | Maurer et al. |
| 2016/0121316 | A1 | 5/2016 | Naraki |
| 2018/0093255 | A1 * | 4/2018 | Chen ....................... B01J 29/70 |
| 2018/0093258 | A1 * | 4/2018 | Chen ....................... B01J 37/10 |

FOREIGN PATENT DOCUMENTS

| | | |
|---|---|---|
| JP | 2015-155364 | 8/2015 |
| JP | 2015-529608 | 10/2015 |
| JP | 2015-536291 | 12/2015 |
| WO | 2013-035054 | 3/2013 |
| WO | 2013-182974 | 12/2013 |

OTHER PUBLICATIONS

Supplementary European Search Report in EP Application No. 17 80 2798.3 dated Feb. 19, 2020.
International Search Report issued in WIPO Patent Application No. PCT/JP2017/019183, dated Jul. 4, 2017.

* cited by examiner

CHA-TYPE ZEOLITE AND METHOD FOR PRODUCING THE SAME

The application is a 371 of PCT/JP2017/019183, filed May 23, 2017.

TECHNICAL FIELD

The present invention relates to a CHA-type zeolite and a method for producing the CHA-type zeolite. In particular, the present invention relates to an industrial method for producing a CHA-type zeolite.

BACKGROUND ART

SSZ-13 has been reported as an aluminosilicate which is a CHA-type zeolite and has a low Al content (PTL 1). SSZ-13 has high stability and therefore is used as a solid acid catalyst for producing ethylene or propylene from methanol (MTO catalyst), a catalyst for reduction of nitrogen oxides in the presence of urea ($NH_3$—SCR catalyst), or a catalyst support of any of these.

The following have been reported as such a CHA-type zeolite and an industrial method for producing the CHA-type zeolite. For example, PTL 1 discloses an N-alkyl-3-quinuclidinol ammonium salt, an N,N,N-trialkyl-2-ammonium exonorbornane salt, or an N,N,N-trimethyladamantylammonium salt as an organic structure-directing agent (hereinafter also referred to as an "OSDA") for obtaining SSZ-13. An N,N,N-trialkyladamantylammonium salt (hereinafter also referred to as an "ADA salt") such as an N,N,N-trimethyladamantylammonium salt (hereinafter also referred to as an "TMAd salt") is used as the OSDA in industrial methods for producing SSZ-13 because of a wide range of production conditions under which a CHA-type zeolite is crystallized.

On the other hand, a method for producing a CHA-type zeolite without using an ADA salt has been studied because ADA salts are expensive.

A production method using, as an OSDA, an N,N,N-trialkylbenzylammonium salt (hereinafter also referred to as a "TABA salt") such as N,N,N-trimethylbenzylammonium hydroxide or N,N,N-triethylbenzylammonium hydroxide (PTL 2) and a production method using, as an OSDA, an N,N,N-trialkylcyclohexylammonium salt (hereinafter also referred to as a "TACHA salt") such as N,N,N-trimethylcyclohexylammonium hydroxide (PTL 3), N,N,N-triethylcyclohexylammonium hydroxide, N,N,N-methyldiethylcyclohexylammonium hydroxide, or N,N,N-dimethylethylcyclohexylammonium hydroxide (PTL 4) have been reported as methods for producing a CHA-type zeolite without using an ADA salt.

CITATION LIST

Patent Literature

PTL 1: U.S. Pat. No. 4,544,538
PTL 2: U.S. Pat. No. 7,597,874
PTL 3: U.S. Patent Application Publication No. 2013/0323164
PTL 4: U.S. Pat. No. 7,670,589

SUMMARY OF INVENTION

Technical Problem

CHA-type zeolites obtained by using a TABA salt as an OSDA are merely CHA-type zeolites similar to those obtained by using an ADA salt alone as an OSDA. Furthermore, the yield of a CHA-type zeolite and production efficiency in the production method using a TABA salt are lower than those in the production method using an ADA salt, although TABA salts are compounds that are cheaper than ADA salts. Accordingly, the production method using a TABA salt has shortcomings such as an increase in the amount of OSDA used, although the unit price of the OSDA can be reduced. Therefore, the reduction in the production cost in the production method by using a TABA salt is limited, and the production method using a TABA salt is not suitable for mass production.

Regarding the already reported method for producing a CHA-type zeolite using a TACHA salt, the reduction in the production cost of a CHA-type zeolite is limited for the reason similar to that in the case of a TABA salt and, in addition, conditions under which a CHA-type zeolite is generated are severely limited. Therefore, the already reported production method using a TACHA salt is still less suitable for mass production because it is difficult to control the production conditions compared with the production method using a TABA salt.

In view of the problems described above, an object of the present invention is to provide a highly crystalline CHA-type zeolite more suitable as a catalyst or a catalyst support than an existing CHA-type zeolite, in particular, an existing CHA-type zeolite obtained by using an ADA salt alone as an organic structure-directing agent. Furthermore, another object of the present invention is to provide a method for producing a CHA-type zeolite, the method producing a highly crystalline CHA-type zeolite with a yield suitable for industrial production.

Solution to Problem

The inventors of the present invention have conducted studies on a CHA-type zeolite more suitable as a catalyst or a catalyst support, and a method for producing a CHA-type zeolite suitable for industrial production. As a result, the inventors have found a CHA-type zeolite having higher heat resistance and crystallinity than an existing CHA-type zeolite obtained by using an ADA salt as an OSDA. Furthermore, the inventors have found that a highly crystalline CHA-type zeolite is obtained by using an ADA salt and a specific TACHA salt in combination with a yield equal to or higher than that in the existing method for producing a CHA-type zeolite using an ADA salt. Furthermore, the inventors have found that a highly crystalline CHA-type zeolite is obtained by using a specific TACHA salt with a yield equal to or higher than that in the existing method for producing a CHA-type zeolite using an ADA salt. These findings led to the realization of the present invention.

Specifically, the gist of the present invention is as follows.
[1] A CHA-type zeolite having a molar ratio of silica to alumina of 10.0 or more and less than 20.0 and a molar ratio of silanol groups to silicon of $0.15 \times 10^{-2}$ or more and $0.50 \times 10^{-2}$ or less, a molar ratio of silica to alumina of 20.0 or more and 35.0 or less and a molar ratio of silanol groups to silicon of $0.15 \times 10^{-2}$ or more and $1.10 \times 10^{-2}$ or less, a molar ratio of silica to alumina of more than 35.0 and 45.0 or less and a molar ratio of silanol groups to silicon of $0.15 \times 10^{-2}$ or more and $1.65 \times 10^{-2}$ or less, or a molar ratio of silica to alumina of more than 45.0 and 55.0 or less and a molar ratio of silanol groups to silicon of $0.15 \times 10^{-2}$ or more and $1.80 \times 10^{-2}$ or less.
[2] The CHA-type zeolite according to [1] above, wherein a ratio of an intensity of a powder X-ray diffraction peak corresponding to a 20-1 reflection of the CHA-type zeolite subjected to heat treatment at 1000° C. for 5 hours in air to an intensity of a powder X-ray diffraction peak corresponding to a 20-1 reflection of the CHA-type zeolite subjected to heat treatment at 600° C. for 5 hours in air is 0.30 or more.

[3] The CHA-type zeolite according to [1] or [2] above, comprising a crystal particle formed by chemical aggregation of primary particles.

[4] A method for producing a CHA-type zeolite, comprising a crystallization step of crystallizing a composition containing an alumina source, a silica source, an alkali source, water, an N,N,N-trialkyladamantylammonium salt and an N,N,N-trialkylcyclohexylammonium salt having a general formula below:

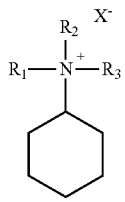

[Chem. 1]

where $R_1$ is an ethyl group, $R_2$ is an alkyl group selected from a methyl group and an ethyl group, $R_3$ is an alkyl group selected from a methyl group and an ethyl group, and $X^-$ is a counter anion of an N,N,N-trialkylcyclohexylammonium cation.

[5] The production method according to [4] above, wherein at least one of the N,N,N-trialkylcyclohexylammonium salt or the N,N,N-trialkyladamantylammonium salt is at least one salt selected from the group consisting of a hydroxide, a chloride, a bromide, an iodide, a carbonic acid monoester salt, a sulfuric acid monoester salt, a nitrate salt and a sulfate salt.

[6] The production method according to [4] or [5] above, wherein a molar ratio of the N,N,N-trialkyladamantylammonium salt to the N,N,N-trialkylcyclohexylammonium salt in the composition is 0.025 or more.

[7] The production method according to any one of [4] to [6] above, wherein a molar ratio of the N,N,N-trialkyladamantylammonium salt to silica in the composition is 0.005 or more and 0.04 or less.

[8] The production method according to any one of [4] to [7] above, wherein the alkali source contains one or more selected from the group consisting of potassium, rubidium and cesium.

[9] The production method according to any one of [4] to [8] above, wherein a molar ratio of one or more selected from the group consisting of potassium, rubidium and cesium to silica in the composition is more than 0 and less than 0.15.

[10] The production method according to any one of [4] to [9] above, wherein the N,N,N-trialkyladamantylammonium salt is an N,N,N-trimethyladamantylammonium salt.

[11] The production method according to any one of [4] to [10] above, wherein the alumina source and the silica source contain an amorphous aluminosilicate.

[12] The production method according to any one of [4] to [11] above, wherein a molar ratio of hydroxide ions to silica in the composition is 0.30 or less.

[13] The production method according to any one of [4] to [12] above, wherein the N,N,N-trialkylcyclohexylammonium salt is at least one of an N,N,N-dimethylethylcyclohexylammonium salt or an N,N,N-methyldiethylcyclohexylammonium salt.

[14] The production method according to any one of [4] to [13] above, wherein the composition has a composition below:

$SiO_2/Al_2O_3$=10 or more and 60 or less
TMAd/DMECHA=0.025 or more and 1.0 or less
$OSDA/SiO_2$=0.06 or more and 0.20 or less
$M/SiO_2$=0.10 or more and 0.30 or less
$OH/SiO_2$=0.05 or more and 0.50 or less
$H_2O/SiO_2$=10.0 or more and 20.0 or less
Seed crystal=0.0% by weight or more and 5.0% by weight where TMAd is an N,N,N-trimethyladamantylammonium salt, DMECHA is an N,N,N-dimethylethylcyclohexylammonium salt, OSDA includes the N,N,N-dimethylethylcyclohexylammonium salt and the N,N,N-trimethyladamantylammonium salt, and M is Na and K.

[15] A method for producing a CHA-type zeolite, comprising a crystallization step of crystallizing a composition containing an alumina source, a silica source, an alkali source, water and an N,N,N-dimethylethylcyclohexylammonium salt having a general formula below alone as an organic structure-directing agent, wherein the alkali source contains at least sodium, and a molar ratio of sodium to silica in the composition is more than 0 and 0.095 or less:

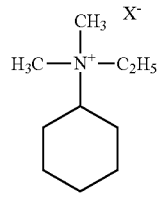

[Chem. 2]

where $X^-$ is a counter anion of an N,N,N-dimethylethylcyclohexylammonium cation.

[16] The production method according to [15] above, wherein the N,N,N-dimethylethylcyclohexylammonium salt comprises at least one salt selected from the group consisting of a hydroxide, a chloride, a bromide, an iodide, a carbonic acid monoester salt, a sulfuric acid monoester salt, a nitrate salt and a sulfate salt.

[17] The production method according to [15] or [16] above, wherein the alkali source contains one or more selected from the group consisting of potassium, rubidium and cesium.

[18] The production method according to any one of [15] to [17] above, wherein a molar ratio of one or more selected from the group consisting of potassium, rubidium and cesium to silica in the raw-material composition is more than 0 and less than 0.15.

[19] The production method according to any one of [15] to [18] above, wherein the alumina source and the silica source contain an amorphous aluminosilicate.

[20] The production method according to any one of [15] to [19] above, wherein a molar ratio of hydroxide ions to silica in the composition is 0.30 or less.

Advantageous Effects of Invention

The present invention can provide a highly crystalline CHA-type zeolite more suitable as a catalyst or a catalyst support than an existing CHA-type zeolite, in particular, an existing CHA-type zeolite obtained by using an ADA salt alone as an organic structure-directing agent, and in particular, a CHA-type zeolite suitable as a catalyst for reduction of nitrogen oxides or a support of the catalyst, and further a catalyst for reduction of nitrogen oxides in the presence of urea or a support of the catalyst. Furthermore, the present invention can provide a method for producing a CHA-type zeolite, the method producing a highly crystalline CHA-type zeolite with a yield suitable for industrial production.

DESCRIPTION OF EMBODIMENTS

Hereinafter, CHA-type zeolites according to the present invention will be described in detail.

The present invention relates to CHA-type zeolites. CHA-type zeolites are crystalline aluminosilicates having a crystal structure identified as the CHA structure in the structure codes defined by the International Zeolite Association (hereinafter, also simply referred to as "CHA structure"). The CHA structure can be identified by a powder X-ray diffraction (hereinafter referred to as "XRD") pattern. For example, the comparison with the XRD pattern of Table 1 or 2 in PTL 1 enables a CHA-type zeolite according to the present invention to be identified as a CHA-type zeolite having the same crystal structure as SSZ-13. Table 1 in PTL 1 shows an XRD pattern of a CHA-type zeolite containing an OSDA in the crystal structure. Table 2 in PTL 1 shows an XRD pattern of a CHA-type zeolite from which an OSDA in the crystal structure has been removed.

The CHA-type zeolite according to the present invention has the CHA structure alone as a crystal structure and preferably does not have any crystal structure other than the CHA structure.

Figure 1:
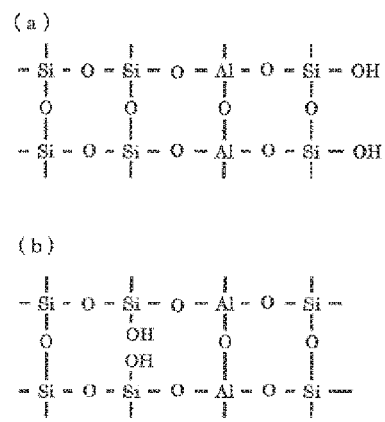
FIG. 1 Schematic views illustrating framework end portions of a CHA-type zeolite. (a) A schematic view illustrating a terminal portion in the network structure of the framework structure. (b) A schematic view illustrating an end portion in the network structure of the framework structure.
Figure 2:
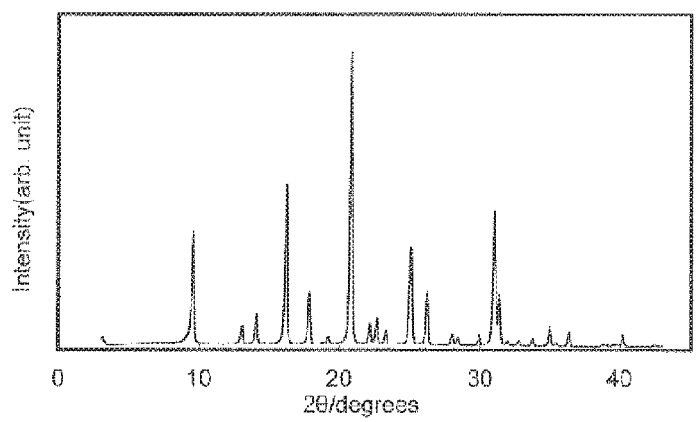
FIG. 2 An XRD pattern of the CHA-type zeolite of Example A-1.
Figure 3:
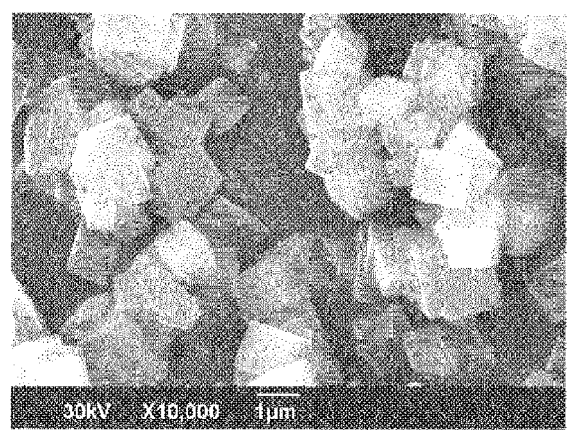
FIG. 3 A scanning electron micrograph of the CHA-type zeolite of Example A-1.
Figure 4:
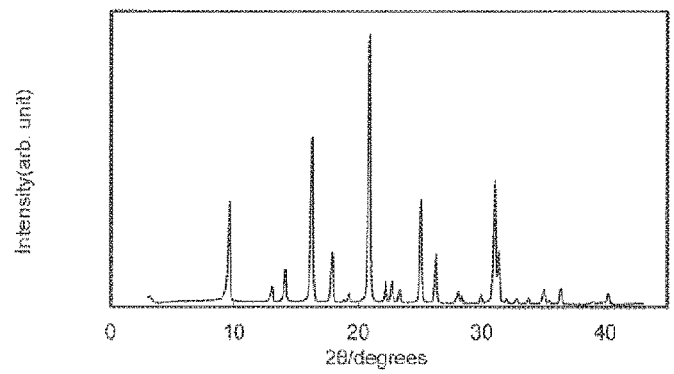
FIG. 4 An XRD pattern of the CHA-type zeolite of Example B-8.
Figure 5:
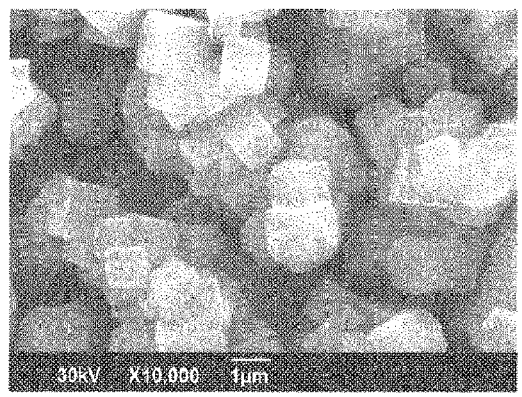
FIG. 5 A scanning electron micrograph of the CHA-type zeolite of Example B-8.
Figure 6:
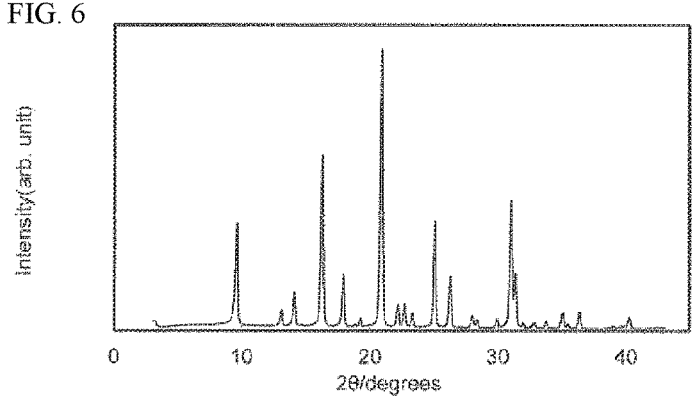
FIG. 6 An XRD pattern of the CHA-type zeolite of Example B-9.
Figure 7:
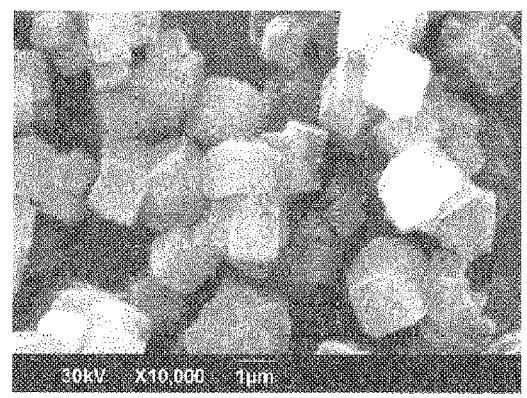
FIG. 7 A scanning electron micrograph of the CHA-type zeolite of Example B-9.
Figure 8:
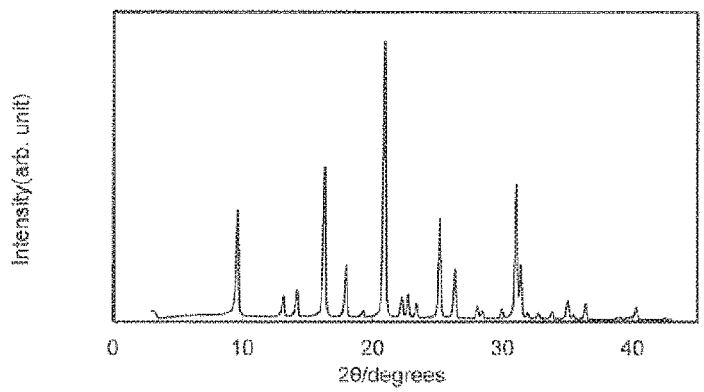
FIG. 8 An XRD pattern of the CHA-type zeolite of Example B-10.
Figure 9:
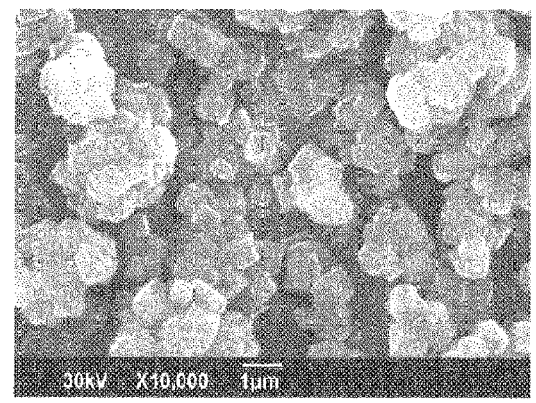
FIG. 9 A scanning electron micrograph of the CHA-type zeolite of Example B-10.
Figure 10:
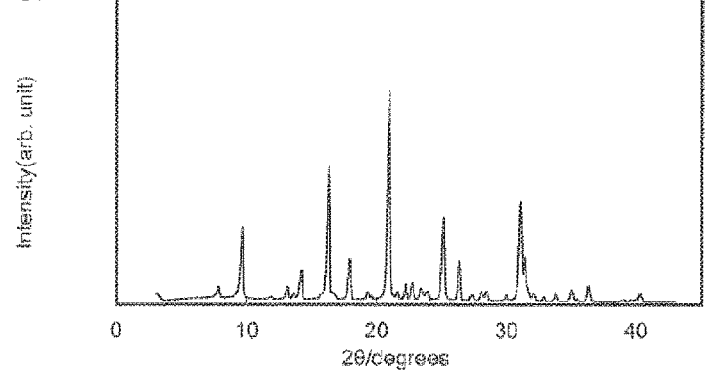
FIG. 10 An XRD pattern of the mixture of the CHA-type zeolite and the ERI-type zeolite of Comparative Example B-5.
Figure 11:
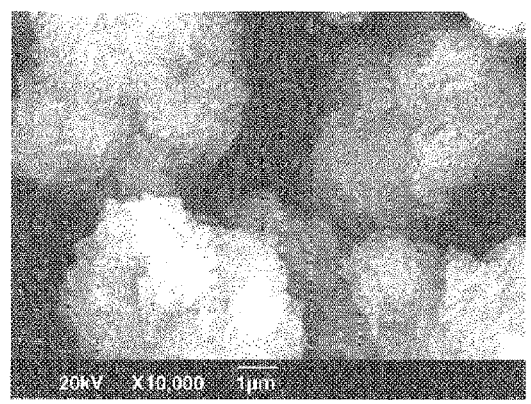
FIG. 11 A scanning electron micrograph of the mixture of the CHA-type zeolite and the ERI-type zeolite of Comparative Example B-5.
Figure 12:
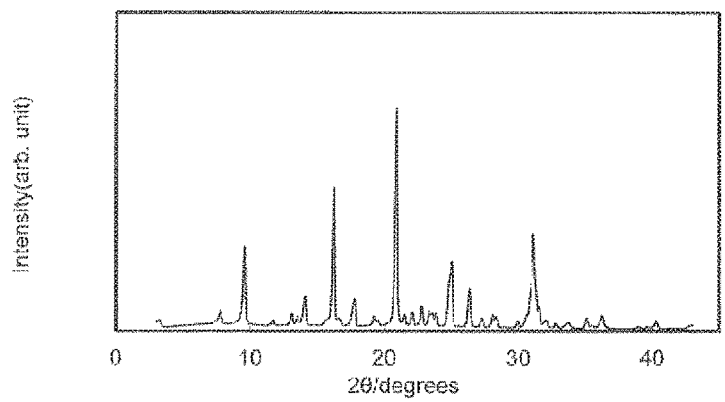
FIG. 12 An XRD pattern of the mixture of the CHA-type zeolite and the ERI-type zeolite of Comparative Example B-9.
Figure 13:
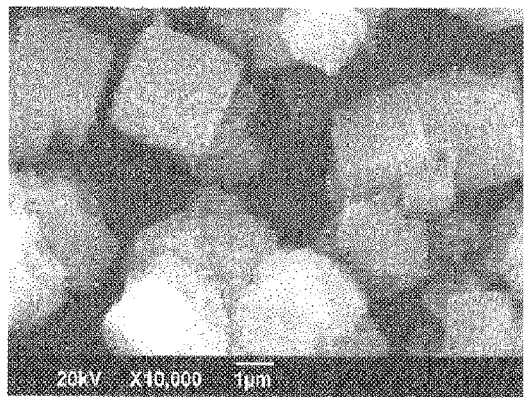
FIG. 13 A scanning electron micrograph of the mixture of the CHA-type zeolite and the ERI-type zeolite of Comparative Example B-9.
Figure 14:
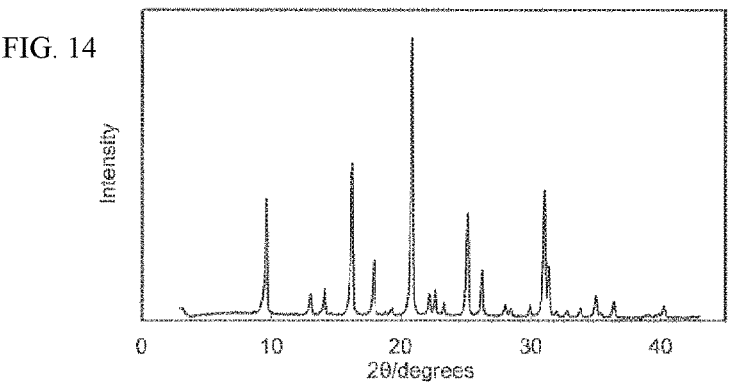
FIG. 14 An XRD pattern of the CHA-type zeolite of Example C-2.
Figure 15:
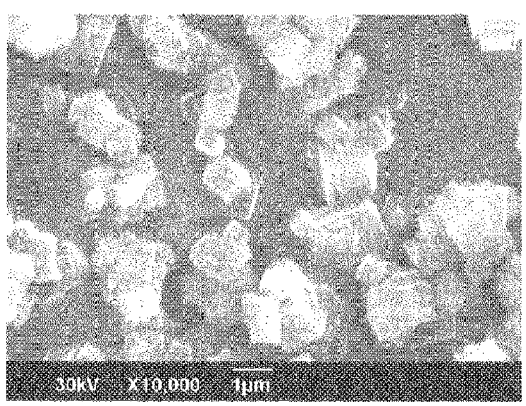
FIG. 15 A scanning electron micrograph of the CHA-type zeolite of Example C-2.
Figure 16:
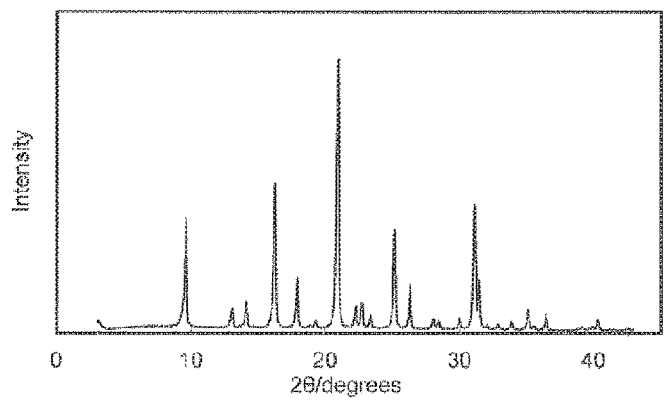
FIG. 16 An XRD pattern of the CHA-type zeolite of Example C-3.
Figure 17:
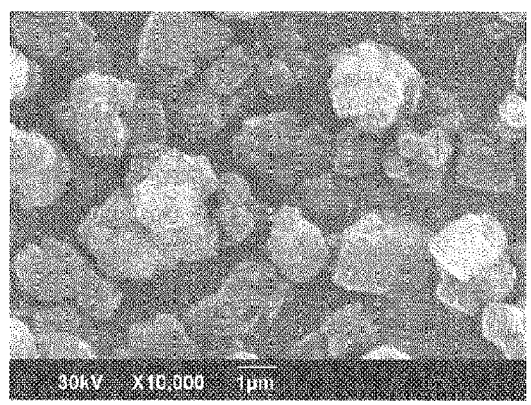
FIG. 17 A scanning electron micrograph of the CHA-type zeolite of Example C-3.
Figure 18:
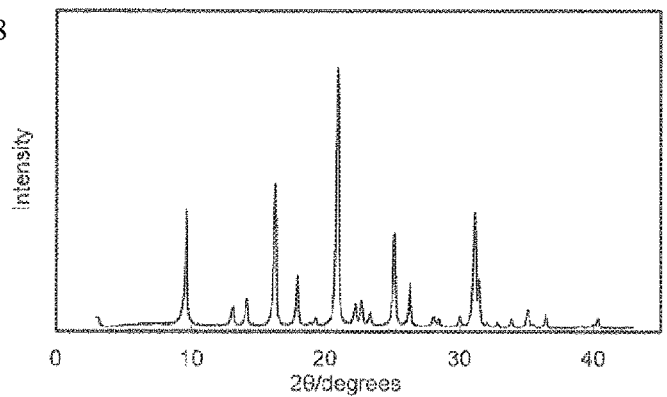
FIG. 18 An XRD pattern of the CHA-type zeolite of Example C-7.
Figure 19:
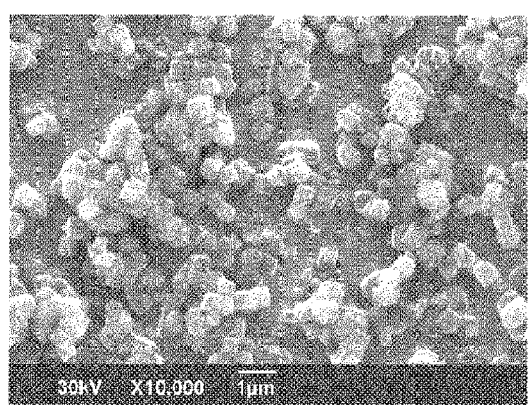
FIG. 19 A scanning electron micrograph of the CHA-type zeolite of Example C-7.

The CHA-type zeolite according to the present invention is a crystalline aluminosilicate. The crystalline aluminosilicate is formed of crystals having a framework structure which is a three-dimensional network structure including aluminum (Al) and silicon (Si) as framework metals (hereinafter also referred to as "T atoms") in which the T atoms are bonded together with oxygen (O) therebetween. Therefore, the CHA-type zeolite according to the present invention includes neither a silicoaluminophosphate (SAPO) nor an aluminophosphate (AlPO) that contains phosphorus (P) as a T atom. Furthermore, conceptual crystalline aluminosilicates are constituted by the network structure alone. In contrast, as illustrated in FIG. 1, crystalline aluminosilicates that actually exist have a terminal portion (FIG. 1(a)) of the network structure and an end portion (FIG. 1(b)) in the network structure (hereinafter, these are also collectively referred to as "framework end portions"), and the framework end portions each form a silanol group (Si—OH). Accordingly, the crystals of crystalline aluminosilicates that actually exist include silanol groups.

Silanol groups are formed by a bond between silicon (Si) serving as a T atom and a hydroxyl group (OH). Therefore, the content of silanol groups is affected by the amount of silicon in the framework structure. For example, zeolites having a larger amount of silicon in the framework structure, that is, high silica zeolites tend to have a high content of silanol groups. In general, an increase in the content of silanol groups easily causes collapse of the framework structure in a high-temperature atmosphere. In contrast, even in the case of a high content of silanol groups, collapse of the framework structure in a high-temperature atmosphere is unlikely to occur as long as both a molar ratio of silica to alumina (hereinafter also referred to as "$SiO_2/Al_2O_3$") and a molar ratio of silanol groups to silicon (hereinafter also referred to as a "ratio SiOH/Si") satisfy the ranges of the CHA-type zeolite according to the present invention. Accordingly, the CHA-type zeolite according to the present invention exhibits high heat resistance and is suitable as a catalyst or a catalyst support, and in particular, as a catalyst for reduction of nitrogen oxides or a support of the catalyst.

SiOH/Si of the CHA-type zeolite according to the present invention depends on $SiO_2/Al_2O_3$ because the amount of silanol groups is affected by the content of silicon. Specifically, the CHA-type zeolite according to the present invention has a molar ratio of silica to alumina of 10.0 or more and less than 20.0 and a molar ratio of silanol groups to silicon of $0.15 \times 10^{-2}$ or more and $0.50 \times 10^{-2}$ or less, a molar ratio of silica to alumina of 20.0 or more and 35.0 or less and a molar ratio of silanol groups to silicon of $0.15 \times 10^{-2}$ or more and $1.10 \times 10^{-2}$ or less, a molar ratio of silica to alumina of more than 35.0 and 45.0 or less and a molar ratio of silanol groups to silicon of $0.15 \times 10^{-2}$ or more and $1.65 \times 10^{-2}$ or less, or a molar ratio of silica to alumina of more than 45.0 and 55.0 or less and a molar ratio of silanol groups to silicon of $0.15 \times 10^{-2}$ or more and $1.80 \times 10^{-2}$ or less.

When $SiO_2/Al_2O_3$ of the CHA-type zeolite according to the present invention is 10.0 or more and less than 20.0, the ratio SiOH/Si is $0.15 \times 10^{-2}$ or more and $0.50 \times 10^{-2}$ or less. The ratio SiOH/Si in this case is preferably $0.40 \times 10^{-2}$ or less.

When $SiO_2/Al_2O_3$ of the CHA-type zeolite according to the present invention is 20.0 or more and 35.0 or less, the ratio SiOH/Si is $0.15 \times 10^{-2}$ or more and $1.10 \times 10^{-2}$ or less. The ratio SiOH/Si in this case is preferably less than $1.00 \times 10^{-2}$.

When $SiO_2/Al_2O_3$ of the CHA-type zeolite according to the present invention is more than 35.0 and 45.0 or less, the ratio SiOH/Si is $0.15 \times 10^{-2}$ or more and $1.65 \times 10^{-2}$ or less. The ratio SiOH/Si in this case is preferably $1.40 \times 10^{-2}$ or less, and further $1.30 \times 10^{-2}$ or less.

When $SiO_2/Al_2O_3$ of the CHA-type zeolite according to the present invention is more than 45.0 and 55.0 or less, the ratio SiOH/Si is $0.15 \times 10^{-2}$ or more and $1.80 \times 10^{-2}$ or less. The ratio SiOH/Si in this case is preferably $1.75 \times 10^{-2}$ or less.

The ratio SiOH/Si of the CHA-type zeolite according to the present invention may be $0.15 \times 10^{-2}$ or more, $0.20 \times 10^{-2}$ or more, and further $0.30 \times 10^{-2}$ or more. With an increase in $SiO_2/Al_2O_3$ of the CHA-type zeolite according to the present invention, the range of silanol groups contained tends to be wide. Therefore, the ratio SiOH/Si when $SiO_2/Al_2O_3$ is 20.0 or more may be $0.15 \times 10^{-2}$ or more, further $0.40 \times 10^{-2}$ or more, and further $0.50 \times 10^{-2}$ or more. The ratio SiOH/Si when $SiO_2/Al_2O_3$ is more than 35.0 may be $0.15^{-2}$ or more, further $0.6 \times 10^{-2}$ or more, and further $1.0 \times 10^{-2}$ or more. The ratio SiOH/Si when $SiO_2/Al_2O_3$ is more than 45.0 may be $0.15 \times 10^{-2}$ or more, further $0.60 \times 10^{-2}$ or more, further $1.00 \times 10^{-2}$ or more, further $1.20 \times 10^{-2}$ or more, and further $1.40 \times 10^{-2}$ or more.

The ratio SiOH/Si can be obtained from the amount of silanol obtained from a $^1$H MAS NMR spectrum to the content of silicon of a CHA-type zeolite. The content of silicon of the CHA-type zeolite can be obtained by X-ray fluorescence analysis or another chemical composition analysis. An example of the method for measuring the content of silicon by X-ray fluorescence analysis is a calibration-curve method. A calibration curve used in the calibration-curve method may be prepared by measuring the intensity of an X-ray fluorescence peak corresponding to silicon (Si) in each of eight to fifteen silicon-containing compounds having known silicon contents and drawing a calibration curve between the intensity and the silicon content. The content of silicon of the CHA-type zeolite can be measured by measuring the intensity of an X-ray fluorescence peak corresponding to silicon (Si) in an X-ray fluorescence pattern of the CHA-type zeolite, which is a measurement sample, and by comparing the intensity with the calibration curve.

The amount of silanol can be obtained from a $^1$H MAS NMR spectrum. Regarding an example of the method for obtaining the amount of silanol, the amount of silanol can be calculated by the calibration-curve method from a $^1$H MAS NMR spectrum obtained by conducting a $^1$H MAS NMR measurement of the CHA-type zeolite that has been subjected to dehydration treatment.

A more specific method for measuring the amount of silanol includes maintaining the CHA-type zeolite at 350° C. to 400° C. for 5±2 hours under vacuum evacuation to perform dehydration treatment, collecting and weighing the CHA-type zeolite after dehydration treatment in a nitrogen atmosphere, and conducting a $^1$H MAS NMR measurement of the CHA-type zeolite. The amount of silanol in the CHA-type zeolite is obtained by the calibration-curve method from an integrated intensity of a peak (peak at 2.0±0.5 ppm) attributable to a silanol group of a $^1$H MAS NMR spectrum obtained by the measurement.

The CHA-type zeolite according to the present invention has a $SiO_2/Al_2O_3$ of 10.0 or more and 55.0 or less. $SiO_2/Al_2O_3$ in this range is suitable for a catalyst or a catalyst support. Preferably, $SiO_2/Al_2O_3$ is 18.0 or more and 50.0 or less, further 20.0 or more and 45.0 or less, further 20.0 or more and 45.0 or less, and further 20.0 or more and 35.0 or less. $SiO_2/Al_2O_3$ that is particularly suitable for a catalyst for reduction of nitrogen oxides or a support of the catalyst may be 20.0 or more and 55.0 or less, further 20.0 or more and 45.0 or less, further 20.0 or more and 35.0 or less, further 20.0 or more and 31.5 or less, and further 23.0 or more and 31.5 or less.

In this manner, $SiO_2/Al_2O_3$ and the ratio SiOH/Si of the CHA-type zeolite according to the present invention satisfy a certain relationship. In other words, the present invention provides a CHA-type zeolite selected from the group consisting of a CHA-type zeolite having a $SiO_2/Al_2O_3$ of 10.0 or more and less than 20.0 and a ratio SiOH/Si of $0.15 \times 10^{-2}$ or more and $0.50 \times 10^{-2}$ or less, a CHA-type zeolite having a $SiO_2/Al_2O_3$ of 20.0 or more and 35.0 or less and a ratio SiOH/Si of $0.15 \times 10^{-2}$ or more and $1.10 \times 10^{-2}$ or less, a CHA-type zeolite having a $SiO_2/Al_2O_3$ of more than 35.0 and 45.0 or less and a ratio SiOH/Si of $0.10^{-2}$ or more and $1.65 \times 10^{-2}$ or less, and a CHA-type zeolite having a $SiO_2/Al_2O_3$ of more than 45.0 and 55.0 or less and a ratio SiOH/Si of $0.15 \times 10^{-2}$ or more and $1.80 \times 10^{-2}$ or less. Furthermore, the CHA-type zeolite according to the present invention is preferably a CHA-type zeolite that satisfies a combination of any $SiO_2/Al_2O_3$ and any ratio SiOH/Si disclosed herein.

Examples of particularly preferable CHA-type zeolites according to the present invention include a CHA-type zeolite having a $SiO_2/Al_2O_3$ of 20.0 or more and 35.0 or less and a ratio SiOH/Si of $0.15 \times 10^{-2}$ or more and $1.10 \times 10^{-2}$ or less and further a CHA-type zeolite having a $SiO_2/Al_2O_3$ of 23.0 or more and 31.0 or less and a ratio SiOH/Si of $0.40 \times 10^{-2}$ or more and less than $1.00 \times 10^{-2}$.

The CHA-type zeolite according to the present invention preferably has high crystallinity. High crystallinity can be confirmed by a comparison between intensities of XRD peaks of CHA-type zeolites.

The crystallinity of the CHA-type zeolite according to the present invention can be confirmed from the full-width at half maximum (hereinafter also referred to as "FWHM") of an XRD peak. In the CHA-type zeolite according to the present invention, the FWHM of an XRD peak due to the 100 reflection of the CHA-type zeolite (a peak corresponding to 2θ=9.6°±0.5° when CuKα rays are used as a radiation source) is 0.150° or more and 0.200° or less, and the FWHM of an XRD peak due to the 20-1 reflection of the CHA-type zeolite (a peak corresponding to 2θ=20.8°±0.5° when CuKα rays are used as a radiation source) is 0.170° or more and 0.250° or less.

The CHA-type zeolite according to the present invention, the CHA-type zeolite may include crystal particles formed by chemical aggregation of primary particles during crystallization. The CHA-type zeolite according to the present invention has high heat resistance, although the CHA-type zeolite includes such aggregate-like crystal particles (hereinafter also referred to as "aggregate crystal particles") which are formed while primary particles are chemically bonded together. Such an aggregate crystal particle can be identified as a polyhedral crystal particle that includes part of surfaces of primary particles having at least one of a rhombohedral shape or a cubic shape in SEM observation, and may be a polyhedral crystal particle that includes a plurality of surfaces each having a side of 0.5 µm or more and 5.0 µm or less and further 0.5 µm or more and 3.0 µm or less.

The CHA-type zeolite according to the present invention preferably includes crystal particles formed of primary particles that independently grow (hereinafter also referred to as "primary crystal particles") in addition to aggregate crystal particles and may include aggregate crystal particles and primary crystal particles. The primary crystal particles are each a crystal particle in which a primary particle and a crystal particle have the same shape. The primary crystal particles may be crystal particles having at least one of a rhombohedral shape or a cubic shape in SEM observation.

The CHA-type zeolite according to the present invention preferably has high heat resistance. Specifically, preferably, collapse of the framework structure, such as elimination of T atoms from the framework, is unlikely to proceed even after the CHA-type zeolite is exposed to a high-temperature atmosphere. Heat resistance of the CHA-type zeolite according to the present invention can be confirmed by XRD patterns of the CHA-type zeolite before and after exposure to a high-temperature atmosphere.

Collapse of the framework structure of a CHA-type zeolite proceeds slowly when the CHA-type zeolite is heat-treated at 600° C. However, breakdown of the framework structure proceeds significantly when the CHA-type zeolite is heat-treated at 1000° C. The intensity of an XRD peak decreases with the progress of breakdown of the framework structure. Therefore, a ratio (hereinafter also referred to as a "ratio I") of an intensity of an XRD peak corresponding to the 20-1 reflection of a CHA-type zeolite treated at 1000° C. in air (hereinafter also referred to as an "$I_{1000}$") to an intensity of an XRD peak corresponding to the 20-1 reflection of the CHA-type zeolite treated at 600° C. in air (hereinafter also referred to as an "$I_{600}$") can be used as an index of heat resistance. A higher ratio I means higher heat resistance. The ratio I is 1.00 or less because collapse of the framework structure proceeds significantly in the case where heat treatment is performed at 1000° C. compared with the case where heat treatment is performed at 600° C.

A ratio I (hereinafter also referred to as "$I_{1000/600}$") which is a ratio of $I_{1000}$ obtained by performing heat treatment for 5 hours to $I_{600}$ obtained by performing heat treatment for 5 hours is preferably 0.30 or more, more preferably 0.50 or more and particularly preferably 0.52 or more in the CHA-type zeolite according to the present invention.

The air in the heat treatment is air having a dew point of −20° C. or lower, further air having a dew point of −50° C. or lower and preferably air having a low water content. Measurement conditions for the XRD peaks may be the following.

Radiation source: CuKα rays (λ, =1.5405 Å)
Measurement range: 2θ=5° to 43°

Next, a method for producing a CHA-type zeolite according to the present invention will be described.

A production method according to the present invention is a method for producing a CHA-type zeolite, the method including a crystallization step of crystallizing a composition containing an alumina source, a silica source, an alkali source, water and an N,N,N-trialkylcyclohexylammonium salt having a general formula below.

In more detail, one production method according to the present invention is a method for producing a CHA-type zeolite, the method including a crystallization step of crystallizing a composition containing an alumina source, a silica source, an alkali source, water, an N,N,N-trialkyladamantylammonium salt and an N,N,N-trialkylcyclohexylammonium salt having a general formula below (hereinafter also referred to as a "raw-material composition 1").

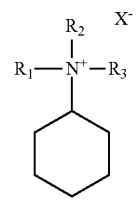

[Chem. 3]

$R_1$ is an ethyl group, $R_2$ is an alkyl group selected from a methyl group and an ethyl group, $R_3$ is an alkyl group selected from a methyl group and an ethyl group and $X^-$ is a counter anion of an N,N,N-trialkylcyclohexylammonium cation.

The raw-material composition 1 contains an N,N,N-trialkylcyclohexylammonium (hereinafter also referred to as "MECHA") salt having a general formula below. The MECHA salt contained in the raw-material composition 1 increases the directivity to a CHA-type zeolite. The structural formula of the MECHA salt is shown below.

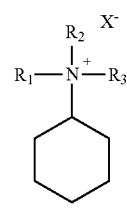

[Chem. 4]

$R_1$ is an ethyl group, $R_2$ is an alkyl group selected from a methyl group and an ethyl group, $R_3$ is an alkyl group selected from a methyl group and an ethyl group, and $X^-$ is a counter anion of an N,N,N-trialkylcyclohexylammonium cation (hereinafter also referred to as a "MECHA$^+$"). $R_2$ and $R_3$ are preferably different alkyl groups.

The MECHA$^+$ contained in the MECHA salt functions as an OSDA that directs the CHA structure. Furthermore, the coexistence of the MECHA salt and the ADA salt further enhances the directing action to a CHA-type zeolite. Consequently, a crystallization region of a CHA-type zeolite extends. Thus, a highly crystalline CHA-type zeolite can be crystalized, for example, even when the amount of seed crystal used is considerably decreased, and further, even when no seed crystal is used. Furthermore, since the ADA salt and the MECHA salt coexist, a CHA-type zeolite is easily obtained even when the raw-material composition 1 has a low content of hydroxide ions (OH$^-$).

The MECHA salt may be any compound containing a MECHA$^+$. The MECHA salt may be at least one selected from the group consisting of a hydroxide, a chloride, a bromide, an iodide, a carbonic acid monoester salt, a sulfuric acid monoester salt, a nitrate salt and a sulfate salt of MECHA. The MECHA salt is preferably at least one selected from the group consisting of a hydroxide, a chloride, a bromide, an iodide, a nitrate salt and a sulfate salt of MECHA, further at least one selected from the group consisting of a chloride, a bromide and an iodide of MECHA, and further at least one of a chloride or a bromide of MECHA from the industrial viewpoint. Accordingly, $X^-$ in the general formula of the MECHA salt may be at least one selected from the group consisting of $OH^-$, $Cl^-$, $Br^-$, $I^-$, $CH_3CO_3^-$, $CH_3SO_4^-$, $C_2H_5SO_4^-$, $NO_3^-$ and $\frac{1}{2}(SO_4^{2-})$ and is preferably at least one selected from the group consisting of $OH^-$, $Cl^-$, $Br^-$ and $I^-$. Furthermore, the MECHA salt may be two or more salts containing $MECHA^+$ and may be at least two selected from the group consisting of a hydroxide, a chloride, a bromide and an iodide of a MECHA salt.

An example of the method for producing a MECHA salt is a production method in which an N,N-dialkylcyclohexylamine and an alkylating agent are allowed to react with each other in a solvent at room temperature to 150° C. The alkylating agent may be at least one selected from the group consisting of alkyl halides, carbonic acid diesters and sulfuric acid diesters. The solvent may be water, an alcohol, and further at least one selected from the group consisting of methanol, ethanol and 2-propanol. As a result, any of a halogenated salt, a carbonic acid monoester salt, or a sulfuric acid monoester salt of MECHA can be synthesized as a MECHA salt. In the case where a hydroxide salt of MECHA is obtained, the MECHA salt obtained above is subjected to ion exchange by using a hydroxide ion-type strongly basic anion-exchange resin.

The MECHA salt is preferably at least one of an N,N,N-dimethylethylcyclohexylammonium salt (hereinafter also referred to as a "DMECHA salt") or an N,N,N-methyldiethylcyclohexylammonium salt (hereinafter also referred to as a "MDECHA salt") and more preferably a DMECHA salt.

The structural formula of the DMECHA salt is shown below.

[Chem. 5]

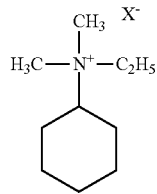

In the above formula, $X^-$ is a counter anion of a DMECHA cation (hereinafter also referred to as "$DMECHA^+$").

The structural formula of the MDECHA salt is shown below.

[Chem. 6]

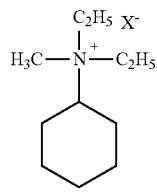

In the above formula, $X^-$ is a counter anion of a MDECHA cation (hereinafter also referred to as "$MDECHA^+$").

The MECHA salt contained in the raw-material composition 1 may be two or more salts containing at least one of $DMECHA^+$ or $MDECHA^+$. For example, the MECHA salt may be at least two selected from the group consisting of a hydroxide, a chloride, a bromide and an iodide of a DMECHA salt, at least two selected from the group consisting of a hydroxide, a chloride, a bromide and an iodide of a MDECHA salt, or at least one selected from the group consisting of a hydroxide, a chloride, a bromide and an iodide of a DMECHA salt and at least one selected from the group consisting of a hydroxide, a chloride, a bromide and an iodide of a MDECHA salt.

The raw-material composition 1 contains an N,N,N-trialkyladamantylammonium salt (ADA salt). Since the MECHA salt and the ADA salt coexist, the amount of ADA salt used can be reduced without decreasing directivity to a CHA-type zeolite, and a highly crystalline CHA-type zeolite is obtained in the form of a single phase with a yield equal to or higher than that in a production method in which an ADA salt is used alone. The structural formula of the ADA salt is shown below.

[Chem. 7]

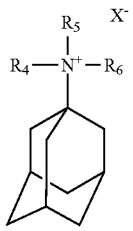

In the formula, $R_4$, $R_5$ and $R_6$ are each an alkyl group and preferably at least one of a methyl group or an ethyl group. $R_4$, $R_5$ and $R_6$ may be the same alkyl group or alkyl groups different from each other. $X^-$ is a counter anion of an N,N,N-trialkyladamantylammonium cation.

Among ADA salts, an N,N,N-trimethyladamantylammonium salt (TMAd salt) is particularly preferred. The structural formula of the TMAd salt is shown below.

[Chem. 8]

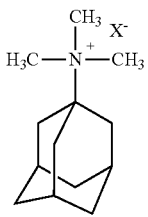

In the formula, $X^-$ is a counter anion of an N,N,N-trimethyladamantylammonium cation.

The ADA salt contained in the raw-material composition 1 may be at least one selected from the group consisting of a hydroxide, a chloride, a bromide, an iodide, a carbonic acid monoester salt, a sulfuric acid monoester salt, a nitrate salt and a sulfate salt. The ADA salt is preferably at least one selected from the group consisting of a hydroxide, a chloride, a bromide and an iodide, further at least one selected from the group consisting of a hydroxide, a chloride and a bromide, further at least one selected from the group consisting of a hydroxide, a chloride and a bromide, and further at least one of a chloride or a bromide from the industrial viewpoint.

Preferably, at least one of the MECHA salt or the ADA salt is at least one salt selected from the group consisting of a chloride, a bromide, an iodide, a carbonic acid monoester salt, a sulfuric acid monoester salt, a nitrate salt and a sulfate salt. More preferably, the MECHA salt and the ADA salt are at least one salt selected from the group consisting of a chloride, a bromide, an iodide, a carbonic acid monoester salt, a sulfuric acid monoester salt, a nitrate salt and a sulfate salt. The yield of the CHA-type zeolite is more easily increased in such a case. Furthermore, since the OSDA includes these salts, the content of hydroxide ions (OH⁻) in the raw-material composition 1 is sufficiently decreased even in the case where the raw-material composition 1 contains the alkali source in the form of a hydroxide. Accordingly, crystallization can be performed in a state in which the raw-material composition 1 contains alkali metal ions in a sufficient amount, that is, in an atmosphere in which the MECHA salt has higher directivity to a CHA-type zeolite. As a result, a highly crystalline CHA-type zeolite is easily obtained with a higher yield.

The alumina source is alumina ($Al_2O_3$) or an aluminum compound serving as a precursor of alumina. For example, the alumina source may be at least one selected from the group consisting of alumina, aluminum sulfate, aluminum nitrate, sodium aluminate, aluminum hydroxide, aluminum chloride, amorphous aluminosilicates, metallic aluminum and aluminum alkoxides.

The silica source is silica ($SiO_2$) or a silicon compound serving as a precursor of silica. For example, the silica source may be at least one selected from the group consisting of colloidal silica, amorphous silica, sodium silicate, tetraethoxysilane, tetraethyl orthosilicate, precipitated silica, fumed silica and amorphous aluminosilicates.

The alumina source and the silica source preferably contain an amorphous aluminosilicate because the crystallization speed of the CHA-type zeolite increases.

The alkali source is an alkali metal compound and preferably a compound of at least one selected from the group consisting of lithium, sodium, potassium, rubidium and cesium and further a compound of at least two selected from the group consisting of lithium, sodium, potassium, rubidium and cesium. The alkali metal compound is preferably at least one selected from the group consisting of a hydroxide, a chloride, a bromide and an iodide of an alkali metal. A particularly preferred alkali source is a compound of at least one of sodium or potassium, further at least one of sodium hydroxide or potassium hydroxide, and further sodium hydroxide and potassium hydroxide. When other raw materials contained in the raw-material composition 1 contain an alkali metal, the alkali metal contained in the raw materials also functions as the alkali source.

The alkali source contained in the raw-material composition 1 preferably contains one or more selected from the group consisting of potassium, rubidium and cesium, and particularly preferably contains potassium because a CHA-type zeolite is easily generated in the form of a single phase.

Examples of the water contained in the raw-material composition 1 include deionized water and pure water. When at least one of the alumina source, the silica source, the MECHA salt, the ADA salt, or the alkali source is an aqueous solution, water contained in these raw materials may be considered as the water.

Preferably, the raw-material composition 1 in the present invention does not contain a fluorine (F)-containing compound. Since fluorine has particularly high corrosiveness, special production facilities that exhibit corrosion resistance are necessary for a production method using a fluorine-containing raw-material composition. As a result, the production cost tends to increase. Thus, preferably, the raw-material composition 1 does not contain fluorine. For example, the raw-material composition 1 preferably has a fluorine content of 1 ppm or less.

A molar ratio of a total of the MECHA salt and the ADA salt to silica (hereinafter also referred to as "OSDA/$SiO_2$") in the raw-material composition 1 is 0.03 or more, and further 0.06 or more. When OSDA/$SiO_2$ is 0.03 or more, a CHA-type zeolite is easily obtained in the form of a single phase. It is not necessary to increase the amount of OSDA to a level more than necessary in terms of production cost, and OSDA/$SiO_2$ is 0.30 or less, and further 0.20 or less. Furthermore, even when OSDA/$SiO_2$ is 0.10 or less, a highly crystalline CHA-type zeolite is obtained in the form of a single phase. Preferably, OSDA/$SiO_2$ is in a range of 0.06 or more and 0.20 or less, further 0.06 or more and 0.12 or less, and further 0.06 or more and 0.10 or less.

With an increase in a molar ratio of the ADA salt to the MECHA salt (hereinafter also referred to as "ADA/MECHA") in the raw-material composition 1, the crystallinity of the resulting CHA-type zeolite is easily increased. However, an increase in the ADA salt in the raw-material composition 1 results in an increase in the production cost. Even when ADA/MECHA is 2.0 or less, further 1.0 or less, and further 0.5 or less in the present invention, a highly crystalline CHA-type zeolite is obtained with a yield substantially equal to that in a production method in which the OSDA includes an ADA salt alone. When ADA/MECHA is 0.025 or more, and further 0.05 or more, a highly crystalline CHA-type zeolite is more easily obtained.

CHA-type zeolite is easily crystallized in the form of a single phase with an increase in a molar ratio of the ADA salt to silica (hereinafter also referred to as "ADA/$SiO_2$") in the raw-material composition 1. Even when ADA/$SiO_2$ is 0.05 or less, and further 0.03 or less, a CHA-type zeolite is obtained with a yield substantially equal to that in a production method in which the OSDA includes an ADA salt alone. When ADA/$SiO_2$ is 0.005 or more, and further 0.010 or more, a CHA-type zeolite is more easily obtained.

Regarding a preferred OSDA content of the raw-material composition 1, a molar ratio of the MECHA salt to silica (hereinafter also referred to as "MECHA/$SiO_2$") may be 0.02 or more and 0.10 or less, ADA/$SiO_2$ may be 0.005 or more and 0.10 or less and ADA/MECHA may be 1.0 or less.

A molar ratio of silica to alumina ($SiO_2/Al_2O_3$) in the raw-material composition 1 is preferably 10 or more and 100 or less, and further 10 or more and 60 or less. When $SiO_2/Al_2O_3$ is 10 or more, heat resistance of the resulting CHA-type zeolite is easily enhanced. On the other hand, when $SiO_2/Al_2O_3$ is 100 or less, the resulting zeolite has sufficient acid sites contributing to a catalytic reaction. More preferably, $SiO_2/Al_2O_3$ in the raw-material composition 1 is 10 or more and 40 or less, and further 10 or more and 35 or less.

A molar ratio of the alkali metal to silica (hereinafter also referred to as "M/$SiO_2$") in the raw-material composition 1 is preferably 0.10 or more and 0.50 or less, and further 0.10 or more and 0.30 or less. When M/$SiO_2$ is 0.10 or more, crystallization of a CHA-type zeolite is easily accelerated. On the other hand, generation of a zeolite having a structure other than the CHA structure is further suppressed when M/$SiO_2$ is 0.50 or less. Furthermore, when M/$SiO_2$ is 0.15 or less, and further 0.13 or less, heat resistance of the resulting CHA-type zeolite tends to increase.

When the raw-material composition 1 contains at least one selected from the group consisting of potassium, rubidium and cesium, and further potassium, a molar ratio of the at least one selected from the group consisting of potassium, rubidium and cesium to silica (hereinafter also referred to as "M1/SiO$_2$") in the raw-material composition 1 is preferably more than 0 and less than 0.15, more preferably more than 0.02 and less than 0.15, and still more preferably 0.03 or more and 0.13 or less.

When the raw-material composition 1 contains sodium and potassium as the alkali metal, a molar ratio of sodium to silica (hereinafter also referred to as "Na/SiO$_2$") in the raw-material composition 1 is preferably more than 0 and 0.12 or less, and more preferably, more than 0 and 0.09 or less. In addition, a molar ratio of sodium to potassium (hereinafter also referred to as "Na/K") may be 0.05 or more and 20.0 or less, further 0.065 or more and 5.0 or less, and further 0.1 or more and 2.0 or less.

A molar ratio of water (H$_2$O) to silica (hereinafter also referred to as "H$_2$O/SiO$_2$") in the raw-material composition 1 is preferably 5.0 or more and 50.0 or less, and further 10.0 or more and 20.0 or less. the raw-material composition 1 has fluidity enough to be stirred when H$_2$O/SiO$_2$ is 5.0 or more. On the other hand, the yield of the CHA-type zeolite is easily increased when H$_2$O/SiO$_2$ is 50.0 or less. Furthermore, even when H$_2$O/SiO$_2$ is 10.0 or more and 15.5 or less, and further 11.0 or more and 15.5 or less, a single phase of a CHA-type zeolite is obtained in some cases by the production method according to the present invention.

A molar ratio of hydroxide anion (OH$^-$) to silica (hereinafter also referred to as "OH/SiO$_2$") in the raw-material composition 1 is preferably 0.05 or more and 1.0 or less, and further 0.1 or more and 0.5 or less. Generation of a zeolite having a structure other than the CHA structure is further suppressed when OH/SiO$_2$ is 0.05 or more. On the other hand, a CHA-type zeolite is easily obtained with a sufficient yield when OH/SiO$_2$ is 1.0 or less. OH/SiO$_2$ is preferably 0.30 or less, further 0.24 or less, further 0.20 or less, and further 0.17 or less because the yield of the resulting CHA-type zeolite tends to further increase. Furthermore, heat resistance of the resulting CHA-type zeolite tends to increase when OH/SiO$_2$ is 0.15 or less.

OH/SiO$_2$ is preferably 0.30 or less, further 0.24 or less, and further 0.20 or less in order to further increase the yield of the CHA-type zeolite.

A CHA-type zeolite is obtained with a high yield within a sufficiently short time by the production method according to the present invention, even when the raw-material composition 1 contains no seed crystal. Accordingly, the raw-material composition 1 may contain no seed crystal, that is, the content of the seed crystal may be 0% by weight.

However, the raw-material composition 1 may contain a seed crystal. The seed crystal is preferably a CHA-type zeolite and further SSZ-13.

When a seed crystal is contained, the content (% by weight) satisfies the following inequality.

0% by weight<{(w3+w4)/(w1+w2)}×100≤30% by weight

In the above inequality, w1 represents a weight of Al in the raw-material composition 1 in terms of Al$_2$O$_3$, w2 represents a weight of Si in the raw-material composition 1 in terms of SiO$_2$, w3 represents a weight of Al in the seed crystal in terms of Al$_2$O$_3$, and w4 represents a weight of Si in the seed crystal in terms of SiO$_2$.

The content of the seed crystal more preferably satisfies the following inequality when a seed crystal is contained:

0% by weight<{(w3+w4)/(w1+w2)}×100≤5% by weight

Further:

1.5% by weight≤{(w3+w4)/(w1+w2)}×100≤5% by weight

A preferred composition of the raw-material composition 1 may be as follows.
SiO$_2$/Al$_2$O$_3$=10 or more and 100 or less
ADA/MECHA=0.015 or more and 2.0 or less
ADA/SiO$_2$=0.003 or more and 0.04 or less
OSDA/SiO$_2$=0.03 or more and 0.30 or less
M/SiO$_2$=0.05 or more and 1.0 or less
OH/SiO$_2$=0.05 or more and 1.0 or less
H$_2$O/SiO$_2$=5.0 or more and 50.0 or less
Seed crystal=0.0% by weight or more and 30.0% by weight or less In the above composition, ADA is an ADA salt, MECHA is a MECHA salt, OSDA includes the MECHA salt and the ADA salt, and M includes Na and K.

A more preferred composition of the raw-material composition 1 may be as follows.
SiO$_2$/Al$_2$O$_3$=10 or more and 60 or less
TMAd/DMECHA=0.025 or more and 1.0 or less
TMAd/SiO$_2$=0.005 or more and 0.02 or less
OSDA/SiO$_2$=0.06 or more and 0.20 or less
M/SiO$_2$=0.10 or more and 0.30 or less
OH/SiO$_2$=0.10 or more and 0.50 or less
H$_2$O/SiO$_2$=10.0 or more and 20.0 or less
Seed crystal=0.0% by weight or more and 5.0% by weight or less In the above composition, TMAd is an N,N,N-trimethyladamantylammonium salt, DMECHA is an N,N,N-dimethylethylcyclohexylammonium salt, OSDA includes the N,N,N-dimethylethylcyclohexylammonium salt and the N,N,N-trimethyladamantylammonium salt, and M includes Na and K.

The raw-material composition 1 is crystallized in the crystallization step. The crystallization method may be hydrothermal synthesis. In such a case, the raw-material mixture is charged in an airtight container, and the container is heated. The crystallization may be performed either in a stationary state or under stirring.

The crystallization temperature is preferably 130° C. or higher and 200° C. or lower, further 140° C. or higher and 180° C. or lower, and further 140° C. or higher and 170° C. or lower. Furthermore, even when the crystallization temperature is 130° C. or higher and 160° C. or lower, and further 130° C. or higher and 155° C. or lower, a CHA-type zeolite with high crystallinity can be obtained within 48 hours by the production method according to the present invention. Thermal decomposition of the OSDA is unlikely to occur at a reaction temperature of 155° C. or lower.

The crystallization temperature may be changed during crystallization within the above ranges. For example, crystallization may be started at 130° C. or higher and 160° C. or lower, and the crystallization temperature may then be changed to higher than 160° C. and 200° C. or lower to perform crystallization.

The crystallization time is preferably 10 hours or more, and further 24 hours (1 day) or more, although the crystallization time varies depending on the crystallization temperature. Consequently, a CHA-type zeolite is crystallized. On the other hand, when the crystallization time is 5 days or less, further 72 hours (3 days) or less, and further 48 hours (2 days) or less, a CHA-type zeolite is easily obtained in the form of a single phase.

The production method according to the present invention may include, after the crystallization step, at least one of a washing step, a drying step and an ion-exchange step.

In the washing step, the CHA-type zeolite after crystallization and a liquid phase are subjected to solid-liquid separation. In the washing step, solid-liquid separation is performed by a known method, and the CHA-type zeolite obtained as a solid phase is washed with deionized water.

In the drying step, water is removed from the CHA-type zeolite after the crystallization step or the washing step. The conditions for the drying step are not particularly limited. For example, the CHA-type zeolite after the crystallization step or the washing step is allowed to stand in air at 50° C. or higher and 150° C. or lower for two hours or more.

The CHA-type zeolite after crystallization has metal ions, such as alkali metal ions, on ion-exchange sites thereof in some cases. In the ion-exchange step, the metal ions are ion-exchanged with non-metal cations, such as ammonium ions ($NH_4^+$) or protons ($H^+$). The ion exchange with ammonium ions may be performed by mixing a CHA-type zeolite with an aqueous solution of ammonium chloride and stirring the resulting mixture. The ion exchange with protons may be performed by subjecting a CHA-type zeolite to ion exchange with ammonia and then calcining the resulting ammonium-type CHA-type zeolite.

The CHA-type zeolite obtainable by the production method according to the present invention is a CHA-type zeolite that contains no zeolite having a structure other than the CHA structure, that is, a single-phase CHA-type zeolite.

A CHA-type zeolite can be obtainable with a sufficiently high yield suitable for industrial production by the production method according to the present invention. Specifically, 70% or more, further 80% or more, and further 90% or more of silica and alumina that are contained in the raw-material composition 1 can be recovered as a CHA-type zeolite by the production method according to the present invention. The yield of a zeolite in the present invention can be obtained by, for example, a weight ratio of a silica content of the resulting crystalline zeolite to a silica content of the raw-material composition 1 (hereinafter also referred to as a "silica yield" or "Si yield").

Almost all aluminum (Al) in the raw-material composition 1 is incorporated into a zeolite in the production method according to the present invention. Accordingly, the silica yield can be obtained from a ratio (%) of $SiO_2/Al_2O_3$ in the product obtained after crystallization to $SiO_2/Al_2O_3$ in the raw-material composition 1. The silica contents of the raw-material composition 1 and the product may be obtained by ICP measurement.

With an increase in the silica yield, the yield of the CHA-type zeolite increases, which is industrially more preferable. The silica yield in the production method according to the present invention is preferably 70% or more, further 80% or more, and further 90% or more.

Furthermore, a CHA-type zeolite which is a high-silica zeolite and has a $SiO_2/Al_2O_3$ that is not higher than necessary is obtainable by the production method according to the present invention. For example, $SiO_2/Al_2O_3$ of the CHA-type zeolite obtainable by the production method according to the present invention is preferably 5 or more and 50 or less, and further 10 or more and 30 or less.

The CHA-type zeolite obtainable in the present invention has high crystallinity. The high crystallinity in the present invention can be confirmed by the fact that crystallinity of the CHA-type zeolite obtained by the production method according to the present invention is equal to or higher than crystallinity of existing CHA-type zeolites.

An example of the existing CHA-type zeolites is a CHA-type zeolite obtained by crystalizing a raw-material composition containing a TMAd salt alone as the OSDA.

Crystallinity of a CHA-type zeolite can be obtained from an XRD peak intensity corresponding to the 20-1 reflection of the CHA structure (hereinafter also referred to as a "CHA peak intensity"). The relative crystallinity of a CHA-type zeolite obtainable by the production method according to the present invention can be confirmed by a ratio of the CHA peak intensity of the CHA-type zeolite obtained by the production method according to the present invention to the CHA peak intensity of an existing CHA-type zeolite (hereinafter also referred to as "CHA crystallinity"). The XRD peak corresponding to the 20-1 reflection of the CHA structure can be identified as a peak corresponding to $2\theta=20.8°\pm0.5°$ in the XRD measurement using CuKα rays ($\lambda=1.5405$ Å) as a radiation source.

Furthermore, the zeolite obtainable in the present invention is a single-phase CHA-type zeolite, that is, a zeolite that contains neither a zeolite having a crystal phase other than that of the CHA-type zeolite nor an amorphous aluminosilicate.

Next, a method for producing a CHA-type zeolite according to the present invention will be described.

A production method according to the present invention is a method for producing a CHA-type zeolite, the method including a crystallization step of crystallizing a composition containing an alumina source, a silica source, an alkali source, water and an N,N,N-trialkylcyclohexylammonium salt having a general formula below.

In more detail, one production method according to the present invention is a method for producing a CHA-type zeolite, the method including a crystallization step of crystallizing a composition containing an alumina source, a silica source, an alkali source, water and an N,N,N-dimethylethylcyclohexylammonium salt having a general formula below alone as an organic structure-directing agent (hereinafter also referred to as a "raw-material composition 2"), in which the alkali source contains at least sodium, and a molar ratio of sodium to silica in the composition is more than 0 and 0.095 or less.

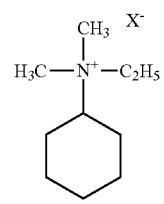

[Chem. 9]

X⁻ is a counter anion of an N,N,N-dimethylethylcyclohexylammonium cation.

Since the raw-material composition 2 contains a specific OSDA and has a specific sodium content, a CHA-type zeolite can be crystallized within a realistic time by the production method according to the present invention.

The N,N,N-dimethylethylcyclohexylammonium (hereinafter also referred to as "DMECHA") salt may be any compound containing an N,N,N-dimethylethylcyclohexylammonium cation (hereinafter also referred to as "DMECHA⁺"). The DMECHA salt may be at least one selected from the group consisting of a hydroxide, a chloride, a bromide, an iodide, a carbonic acid monoester salt, a sulfuric acid monoester salt, a nitrate salt and a sulfate salt of DMECHA. The DMECHA salt is preferably at least one selected from the group consisting of a hydroxide, a chloride, a bromide, an iodide, a nitrate salt and a sulfate salt of DMECHA, further at least one selected from the group consisting of a chloride, a bromide and an iodide of DMECHA, and further at least one of a chloride or a bromide of DMECHA from the industrial viewpoint. Furthermore, the DMECHA salt may be at least two selected from the group consisting of a hydroxide, a chloride, a bromide and an iodide of DMECHA. The yield of the CHA-type zeolite is more easily increased in such a case. Furthermore, since the OSDA includes these salts, the content of hydroxide ions (OH) in the raw-material composition 2 is sufficiently decreased even in the case where the raw-material composition 2 contains the alkali source in the form of a hydroxide. Accordingly, crystallization can be performed in a state in which the raw-material composition 2 contains alkali metal ions in a sufficient amount, that is, in an atmosphere in which the DMECHA salt has higher directivity to a CHA-type zeolite. As a result, a highly crystalline CHA-type zeolite is easily obtained with a higher yield.

$X^-$ in the general formula of the DMECHA salt may be at least one selected from the group consisting of $OH^-$, $Cl^-$, $Br^-$, $I^-$, $CH_3CO_3^-$, $CH_3SO_4^-$, $C_2H_5SO_4^-$, $NO_3^-$ and $\frac{1}{2}(SO_4^{2-})$ and is preferably at least one selected from the group consisting of $OH^-$, $Cl^-$, $Br^-$ and $I^-$.

An example of the method for producing a DMECHA salt is a production method in which N,N-dimethylcyclohexylamine and an alkylating agent are allowed to react with each other in a solvent at room temperature to 150° C. The alkylating agent may be at least one selected from the group consisting of ethyl halides, diethyl carbonate and diethyl sulfate. The solvent is preferably one capable of dissolving the raw materials and may be water, an alcohol, and further at least one selected from the group consisting of methanol, ethanol and 2-propanol. As a result, any of a halogenated salt, a carbonic acid monoester salt, or a sulfuric acid monoester salt of DMECHA can be synthesized as a DMECHA salt. In the case where a hydroxide salt of DMECHA is obtained, the DMECHA salt obtained above is subjected to ion exchange by using a hydroxide ion-type strongly basic anion-exchange resin.

The structural formula of the DMECHA salt is shown below.

The alumina source is alumina ($Al_2O_3$) or an aluminum compound serving as a precursor of alumina. For example, the alumina source may be at least one selected from the group consisting of alumina, aluminum sulfate, aluminum nitrate, sodium aluminate, aluminum hydroxide, aluminum chloride, amorphous aluminosilicates, metallic aluminum and aluminum alkoxides.

The silica source is silica ($SiO_2$) or a silicon compound serving as a precursor of silica. For example, the silica source may be at least one selected from the group consisting of colloidal silica, amorphous silica, sodium silicate, tetraethoxysilane, tetraethyl orthosilicate, precipitated silica, fumed silica and amorphous aluminosilicates.

The alumina source and the silica source preferably contain an amorphous aluminosilicate because the crystallization speed of the CHA-type zeolite increases.

The alkali source contains at least sodium. For example, the alkali source may be compounds of sodium, and further at least one selected from the group consisting of a hydroxide, a chloride, a bromide and an iodide of sodium. The alkali source is preferably at least one selected from the group consisting of a hydroxide, a chloride and a bromide of sodium, and further a hydroxide of sodium. The alkali source may contain a compound of an alkali metal other than sodium. The alkali source may contain a compound of at least one selected from the group consisting of lithium, potassium, rubidium and cesium, and further a compound of at least one selected from the group consisting of potassium, rubidium and cesium. The compound of an alkali metal other than sodium is preferably at least one selected from the group consisting of a hydroxide, a chloride, a bromide and an iodide.

The alkali source contained in the raw-material composition 2 preferably contains one or more selected from the group consisting of potassium, rubidium and cesium, and particularly preferably contains potassium because a CHA-type zeolite is easily generated in the form of a single phase. A particularly preferred alkali source other than the compounds of sodium includes compounds of potassium, and further potassium hydroxide. The raw-material composition 2 particularly preferably contains sodium and potassium.

The alkali metal contained in the raw materials also functions as the alkali source, when other raw materials contained in the raw-material composition 2 contain an alkali metal.

Examples of the water contained in the raw-material composition 2 include deionized water and pure water. When at least one of the alumina source, the silica source, the DMECHA salt, or the alkali source is an aqueous solution, water contained in these raw materials may be considered as the water.

Preferably, the raw-material composition 2 in the present invention does not contain a fluorine (F)-containing compound. Since fluorine has particularly high corrosiveness, special production facilities that exhibit corrosion resistance are necessary for a production method using a fluorine-containing raw-material composition. As a result, the production cost tends to increase. Thus, preferably, the raw-material composition 2 does not contain fluorine. For example, the raw-material composition 2 preferably has a fluorine content of 1 ppm or less.

A molar ratio of the DMECHA salt to silica (hereinafter also referred to as "$DMECHA/SiO_2$" or "$OSDA/SiO_2$") in the raw-material composition 2 is 0.03 or more, and further 0.06 or more. When $OSDA/SiO_2$ is 0.03 or more, a CHA-type zeolite is easily obtained in the form of a single phase. It is not necessary to increase the amount of OSDA to a level more than necessary in terms of production cost, and $OSDA/SiO_2$ is 0.30 or less, and further 0.20 or less. Furthermore, even when $OSDA/SiO_2$ is 0.10 or less, a highly crystalline CHA-type zeolite is obtained in the form of a single phase. Preferably, $OSDA/SiO_2$ is in a range of 0.06 or more and 0.20 or less, further 0.06 or more and 0.12 or less, and further 0.06 or more and 0.10 or less.

The raw-material composition 2 contains the DMECHA salt alone as an OSDA. Meanwhile, the raw-material composition 2 may contain an OSDA, for example, an ADA salt, contained in a crystalline aluminosilicate that is contained in the raw-material composition 2 as a seed crystal or a silica or alumina source. In this case, a molar ratio of the ADA salt to silica (hereinafter also referred to as "$ADA/SiO_2$") in the raw-material composition 2 may be less than 0.005, and $ADA/SiO_2$ is preferably 0.003 or less.

A molar ratio of silica to alumina ($SiO_2/Al_2O_3$) in the raw-material composition 2 is preferably 10 or more and 100 or less, and further 10 or more and 60 or less. Heat resistance of the resulting CHA-type zeolite is easily enhanced when $SiO_2/Al_2O_3$ is 10 or more. On the other hand, when $SiO_2/Al_2O_3$ is 100 or less, the resulting zeolite has sufficient acid sites contributing to a catalytic reaction. More preferably, $SiO_2/Al_2O_3$ in the raw-material composition 2 is 10 or more and 40 or less, and further 10 or more and 35 or less.

A molar ratio of sodium to silica (hereinafter also referred to as "$Na/SiO_2$") in the raw-material composition 2 is more than 0 and 0.095 or less. A CHA-type zeolite is not crystallized within a realistic time, and further, crystallization of zeolite itself does not proceed when $Na/SiO_2$ is more than 0.095. $Na/SiO_2$ is preferably more than 0 and 0.09 or less, more preferably 0.02 or more and 0.09 or less, and more preferably 0.02 or more and 0.08 or less.

A molar ratio of a total of the alkali metals to silica (hereinafter also referred to as "$M_{total}/SiO_2$") in the raw-material composition 2 is preferably 0.10 or more and 0.50 or less, and further 0.10 or more and 0.30 or less. When $M_{total}/SiO_2$ is 0.10 or more, crystallization of a CHA-type zeolite is easily accelerated. On the other hand, generation of a zeolite having a structure other than the CHA structure is further suppressed when $M_{total}/SiO_2$ is 0.50 or less. Furthermore, when $M_{total}/SiO_2$ is 0.15 or less, and further 0.13 or less, heat resistance of the resulting CHA-type zeolite tends to increase.

When the raw-material composition 2 contains at least one selected from the group consisting of potassium, rubidium and cesium, and further potassium, a molar ratio of the at least one selected from the group consisting of potassium, rubidium and cesium to silica (hereinafter also referred to as "$M_{add}/SiO_2$") in the raw-material composition 2 is preferably more than 0 and less than 0.15, more preferably more than 0.02 and less than 0.15, and still more preferably 0.03 or more and 0.13 or less.

When the raw-material composition 2 contains sodium and potassium as the alkali metal, a molar ratio of sodium to potassium (hereinafter also referred to as "Na/K") may be 0.05 or more and 20.0 or less, further 0.065 or more and 5.0 or less, and further 0.1 or more and 2.0 or less.

A molar ratio of water ($H_2O$) to silica (hereinafter also referred to as "$H_2O/SiO_2$") in the raw-material composition 2 is preferably 5.0 or more and 50.0 or less, and further 10.0 or more and 20.0 or less. The raw-material composition 2 has fluidity enough to be stirred when $H_2O/SiO_2$ is 5.0 or more. On the other hand, the yield of the CHA-type zeolite is easily increased when $H_2O/SiO_2$ is 50.0 or less. Furthermore, even when $H_2O/SiO_2$ is 10.0 or more and 15.5 or less, and further 11.0 or more and 15.5 or less, a single phase of a CHA-type zeolite is obtained in some cases by the production method according to the present invention.

A molar ratio of hydroxide anion ($OH^-$) to silica (hereinafter also referred to as "$OH/SiO_2$") in the raw-material composition 2 is preferably 0.05 or more and 1.0 or less, and further 0.1 or more and 0.5 or less. When $OH/SiO_2$ is 0.05 or more, generation of a zeolite having a structure other than the CHA structure is further suppressed. On the other hand, a CHA-type zeolite is easily obtained with a sufficient yield when $OH/SiO_2$ is 1.0 or less. $OH/SiO_2$ is preferably 0.30 or less, further 0.24 or less, further 0.20 or less, and further 0.17 or less because the yield of the resulting CHA-type zeolite tends to further increase. Furthermore, heat resistance of the resulting CHA-type zeolite tends to increase when $OH/SiO_2$ is 0.15 or less.

$OH/SiO_2$ is preferably 0.30 or less, further 0.24 or less, and further 0.20 or less in order to further increase the yield of the CHA-type zeolite.

A CHA-type zeolite is obtained with a high yield within a sufficiently short time by the production method according to the present invention, even when the raw-material composition 2 contains no seed crystal. Accordingly, the raw-material composition 2 may contain no seed crystal, that is, the content of the seed crystal may be 0% by weight.

However, the raw-material composition 2 may contain a seed crystal. The seed crystal is preferably a CHA-type zeolite and further SSZ-13.

When a seed crystal is contained, the content (% by weight) satisfies the following inequality.

0% by weight<{(w3+w4)/(w1+w2)}×100≤30% by weight

In the above inequality, w1 represents a weight of Al in the raw-material composition 2 in terms of $Al_2O_3$, w2 represents a weight of Si in the raw-material composition 2 in terms of $SiO_2$, w3 represents a weight of Al in the seed crystal in terms of $Al_2O_3$, and w4 represents a weight of Si in the seed crystal in terms of $SiO_2$.

The content of the seed crystal more preferably satisfies the following inequality, when a seed crystal is contained:

0% by weight<{(w3+w4)/(w1+w2)}×100≤5% by weight

Further:

1.5% by weight≤{(w3+w4)/(w1+w2)}×100≤5% by weight

A preferred composition of the raw-material composition 2 may be as follows.
$SiO_2/Al_2O_3$=10 or more and 100 or less
$OSDA/SiO_2$=0.03 or more and 0.30 or less
$Na/SiO_2$=more than 0 and 0.09 or less
$M_{total}/SiO_2$=0.05 or more and 1.0 or less
$OH/SiO_2$=0.05 or more and 1.0 or less
$H_2O/SiO_2$=5.0 or more and 50.0 or less
Seed crystal=0.0% by weight or more and 30.0% by weight or less In the above composition, OSDA is an N,N,N-dimethylethylcyclohexylammonium salt, and alkali metals of $M_{total}$ are Na and K.

A more preferred composition of the raw-material composition 2 may be as follows.
$SiO_2/Al_2O_3$=10 or more and 60 or less
$OSDA/SiO_2$=0.06 or more and 0.20 or less
$Na/SiO_2$=more than 0 and 0.09 or less
$M_{total}/SiO_2$=0.10 or more and 0.30 or less
$OH/SiO_2$=0.10 or more and 0.50 or less
$H_2O/SiO_2$=10.0 or more and 20.0 or less
Seed crystal=0.0% by weight or more and 5.0% by weight or less In the above composition, OSDA is an N,N,N-dimethylethylcyclohexylammonium salt, and alkali metals of $M_{total}$ are Na and K.

The raw-material composition 2 is crystallized in the crystallization step. The crystallization method may be hydrothermal synthesis. In such a case, the raw-material mixture is charged in an airtight container, and the container is heated. The crystallization may be performed either in a stationary state or under stirring.

The crystallization temperature is preferably 130° C. or higher and 200° C. or lower, further 140° C. or higher and 180° C. or lower, and further 140° C. or higher and 170° C. or lower. Furthermore, even when the crystallization temperature is 130° C. or higher and 160° C. or lower, and further 130° C. or higher and 155° C. or lower, a CHA-type zeolite with high crystallinity can be obtained within 48 hours by the production method according to the present invention. Thermal decomposition of the OSDA is unlikely to occur at a reaction temperature of 155° C. or lower.

The crystallization temperature may be changed during crystallization within the above ranges. For example, crystallization may be started at 130° C. or higher and 160° C. or lower, and the crystallization temperature may then be changed to higher than 160° C. and 200° C. or lower to perform crystallization.

The crystallization time is preferably 10 hours or more, and further 24 hours (1 day) or more, although the crystallization time varies depending on the crystallization temperature. Consequently, a CHA-type zeolite is crystallized. On the other hand, when the crystallization time is 5 days or less, further 72 hours (3 days) or less, and further 48 hours (2 days) or less, a CHA-type zeolite is easily obtained in the form of a single phase.

The production method according to the present invention may include, after the crystallization step, at least one of a washing step, a drying step and an ion-exchange step.

In the washing step, the CHA-type zeolite after crystallization and a liquid phase are subjected to solid-liquid separation. In the washing step, solid-liquid separation is performed by a known method, and the CHA-type zeolite obtained as a solid phase is washed with deionized water.

In the drying step, water is removed from the CHA-type zeolite after the crystallization step or the washing step. The conditions for the drying step are not particularly limited. For example, the CHA-type zeolite after the crystallization step or the washing step is allowed to stand in air at 50° C. or higher and 150° C. or lower for two hours or more.

The CHA-type zeolite after crystallization has metal ions, such as alkali metal ions, on ion-exchange sites thereof in some cases. In the ion-exchange step, the metal ions are ion-exchanged with non-metal cations, such as ammonium ions ($NH_4^+$) or protons ($H^+$). The ion exchange with ammonium ions may be performed by mixing a CHA-type zeolite with an aqueous solution of ammonium chloride and stirring the resulting mixture. The ion exchange with protons may be performed by subjecting a CHA-type zeolite to ion exchange with ammonia and then calcining the resulting CHA-type zeolite.

The CHA-type zeolite obtainable by the production method according to the present invention is a CHA-type zeolite that contains no zeolite having a structure other than the CHA structure, that is, a single-phase CHA-type zeolite.

A CHA-type zeolite can be obtainable with a sufficiently high yield suitable for industrial production by the production method according to the present invention. Specifically, 70% or more, further 80% or more, and further 90% or more of silica and alumina that are contained in the raw-material composition 2 can be recovered as a CHA-type zeolite by the production method according to the present invention. The yield of a zeolite in the present invention can be obtained by, for example, a weight ratio of a silica content of the resulting crystalline zeolite to a silica content of the raw-material composition 2 (hereinafter also referred to as a "silica yield" or "Si yield").

Almost all aluminum (Al) in the raw-material composition 2 is incorporated into a zeolite in the production method according to the present invention. Accordingly, the silica yield can be obtained from a ratio (%) of $SiO_2/Al_2O_3$ in the product obtained after crystallization to $SiO_2/Al_2O_3$ in the raw-material composition 2. The silica contents of the raw-material composition 2 and the product may be obtained by ICP measurement.

With an increase in the silica yield, the yield of the CHA-type zeolite increases, which is industrially more preferable. The silica yield in the production method according to the present invention is preferably 70% or more, further 80% or more, and further 90% or more.

Furthermore, a CHA-type zeolite which is a high-silica zeolite and has a $SiO_2/Al_2O_3$ that is not higher than necessary is obtained by the production method according to the present invention. For example, $SiO_2/Al_2O_3$ of the CHA-type zeolite obtainable by the production method according to the present invention is preferably 5 or more and 50 or less, and further 10 or more and 30 or less.

The CHA-type zeolite obtainable in the present invention has high crystallinity. The high crystallinity in the present invention can be confirmed by the fact that crystallinity of the CHA-type zeolite obtainable by the production method according to the present invention is equal to or higher than crystallinity of existing CHA-type zeolites.

An example of the existing CHA-type zeolites is a CHA-type zeolite obtained by crystalizing a raw-material composition containing $TMAD^+$ alone as the OSDA.

The crystallinity of a CHA-type zeolite can be determined from an XRD peak intensity corresponding to the 20-1 reflection of the CHA structure (hereinafter also referred to as a "CHA peak intensity"). The relative crystallinity of a CHA-type zeolite obtainable by the production method according to the present invention can be confirmed by a ratio of the CHA peak intensity of the CHA-type zeolite obtainable by the production method according to the present invention to the CHA peak intensity of an existing CHA-type zeolite (hereinafter also referred to as "CHA crystallinity"). The XRD peak corresponding to the 20-1 reflection of the CHA structure can be identified as a peak corresponding to $2\theta=20.8°\pm0.5°$ in the XRD measurement using CuKα rays ($\lambda=1.5405$ Å) as a radiation source.

Furthermore, the zeolite obtainable in the present invention is a single-phase CHA-type zeolite, that is, a zeolite that contains neither a zeolite having a crystal phase other than that of the CHA-type zeolite nor an amorphous aluminosilicate.

EXAMPLES

Hereinafter, the present invention will be described more specifically on the basis of Examples and Comparative Examples. However, the present invention is not limited to the Examples described below. Evaluation methods and evaluation conditions will be described below.

(Identification of Crystal)

An XRD measurement of a sample was conducted by using a powder X-ray diffractometer (apparatus name: Ultima IV, available from Rigaku Corporation). The measurement was conducted by using CuKα rays ($\lambda=1.5405$ Å) as a radiation source in a measurement range of 2θ of 5° to 43°.

The structure of the sample was identified by comparing the obtained XRD pattern with the XRD pattern of a CHA-type zeolite shown in Table 1 of PTL 1.

Regarding Examples A-1 to A-5, Comparative Example A-1, Examples B-1 to B-11 and Comparative Examples B-1 to B-9, the intensity of an XRD peak corresponding to $2\theta=20.8°$ of the CHA-type zeolite (the XRD peak corresponding to the 20-1 reflection of the CHA-type zeolite) obtained as Comparative Example B-4 was assumed to be 100%, and an intensity relative to the above peak intensity was defined as the CHA crystallinity (%).

Regarding Examples C-1 to C-7 and Comparative Examples C-4 to C-6, the intensity of an XRD peak corresponding to $2\theta=20.8°$ of the CHA-type zeolite (the XRD peak corresponding to the 20-1 reflection of the CHA-type zeolite) obtained as Comparative Example C-7 was assumed to be 100%, and an intensity relative to the above peak intensity was defined as the CHA crystallinity (%).

(Chemical Composition Analysis)

A sample was dissolved in a mixed aqueous solution of hydrofluoric acid and nitric acid to prepare a sample solution. The sample solution was analyzed by inductively coupled plasma atomic emission spectroscopy (ICP-AES) by using an ICP spectrometer (apparatus name: OPTIMA 5300DV, available from PerkinElmer Co., Ltd.). $SiO_2/Al_2O_3$ of the sample was obtained from the measured values of Si and Al.

(Silica Yield)

Values of $SiO_2/Al_2O_3$ of a raw-material composition and a product were obtained by the chemical composition analysis. A ratio of $SiO_2/Al_2O_3$ of the product to $SiO_2/Al_2O_3$ of the raw-material composition was defined as a silica yield to obtain the yield of the product.

(Content of Silanol Group)

The content of silanol groups of a CHA-type zeolite was measured by $^1H$ MAS NMR spectroscopy.

A pretreatment was conducted by maintaining a sample under vacuum evacuation at 400° C. for 5 hours to dehydrate the sample prior to the measurement. After the pretreatment, the sample cooled to room temperature was collected and weighed in a nitrogen atmosphere. A typical NMR spectrometer (apparatus name: VXR-300S, available from Varian, Inc.) was used as a measurement apparatus. The measurement conditions were as follows.

Resonance frequency: 300.0 MHz
Pulse width: π/2
Measurement waiting time: 10 seconds
Number of acquisitions: 32 times
Rotational frequency: 4 kHz
Shift standard: TMS A peak at 2.0±0.5 ppm in the obtained $^1H$ MAS NMR spectrum was determined as a peak attributable to a silanol group. The peak was subjected to waveform separation, and the integrated intensity of the peak was determined. The amount of silanol in the sample was obtained from the integrated intensity by a calibration-curve method.

(Ratio SiOH/Si)

A ratio of the content (mol/g) of silanol groups of the CHA-type zeolite measured by $^1H$ MAS NMR to the content (mol/g) of silicon in the CHA-type zeolite obtained by X-ray fluorescence analysis was determined. This ratio was defined as a ratio SiOH/Si.

(Ratio I)

A single-phase CHA-type zeolite was used as a measurement sample. A pretreatment was conducted by subjecting the CHA-type zeolite to heat treatment at 600° C. to remove an OSDA prior to the measurement, subsequently subjecting the CHA-type zeolite to ion exchange with an aqueous solution of ammonium chloride, and drying the resulting CHA-type zeolite at 110° C. for 3 hours.

The sample after the pretreatment was divided into two parts. One of the parts was heat-treated at 600° C. for 5 hours in air having a dew point of −50° C., and the other part was heat-treated at 1000° C. for 5 hours in air having a dew point of −50° C.

For each of the measurement samples after the heat treatment, an XRD pattern was measured by the same method as that used in the identification of crystals, the XRD pattern was subjected to a background treatment, and the intensity of an XRD peak at 2θ=20.5° to 21.0° corresponding to the 20-1 reflection of the CHA-type zeolite was then determined. The intensity of the XRD peak of the measurement sample heat-treated at 600° C. was defined as $1_{600}$, and the intensity of the XRD peak of the measurement sample heat-treated at 1000° C. was defined as $I_{1000}$. $I_{1000}/I_{600}$ was determined from $I_{600}$ and $I_{1000}$ obtained above.

Synthesis Example 1 (Synthesis of DMECHABr)

50.0 g of N,N-dimethylcyclohexylamine, 42.8 g of ethyl bromide, and 100 mL of ethanol were charged in a 300-mL recovery flask, and allowed to react at 60° C. for 3 hours. After the completion of the reaction, unreacted products and the solvent were distilled off under a reduced pressure at 70° C. to obtain N,N,N-dimethylethylcyclohexylammonium bromide (hereinafter also referred to as "DMECHABr"). The compound was dissolved in deionized water to prepare a 25.0 wt % aqueous DMECHABr solution.

Synthesis Example 2 (Synthesis of DMECHAOH)

20.0 g of DMECHABr obtained in Synthesis Example 1 was dissolved in 180.0 g of deionized water. Ion exchange was performed by passing the resulting aqueous solution through a column filled with an anion-exchange resin (DIAION SA-10A, available from Mitsubishi Chemical Corporation) to obtain an aqueous solution of N,N,N-dimethylethylcyclohexylammonium hydroxide (hereinafter also referred to as "DMECHAOH"). The solution was concentrated at 50° C. with a rotary evaporator to prepare a 25 wt % aqueous DMECHAOH solution.

Synthesis Example 3 (Synthesis of MDECHAI)

50.0 g of N,N-diethylcyclohexylamine and 100 mL of ethanol were charged in a 300-mL recovery flask and cooled with ice. 50.3 g of methyl iodide was added dropwise to the resulting solution over a period of 30 minutes. Subsequently, the temperature of the resulting solution was returned to room temperature, and the solution was allowed to react for 12 hours. After the completion of the reaction, unreacted products and the solvent were distilled off under a reduced pressure at 70° C. to obtain N,N,N-methyldiethylcyclohexylammonium iodide (hereinafter also referred to as "MDECHAI"). The compound was dissolved in deionized water to prepare a 25.0 wt % aqueous MDECHAI solution.

Example A-1

The 25 wt % aqueous DMECHABr solution, a 25 wt % aqueous TMAdCl solution, a 48 wt % aqueous sodium hydroxide solution, a 48 wt % aqueous potassium hydroxide solution, deionized water and an amorphous aluminosilicate ($SiO_2/Al_2O_3$=23.7) were mixed to prepare 50.0 g of a raw-material composition having the molar compositions described below.

$SiO_2/Al_2O_3$=23.7
$OSDA/SiO_2$=0.08
$DMECHABr/SiO_2$=0.06
$TMAdCl/SiO_2$=0.02
$TMAdCl/DMECHABr$=0.33
$K/SiO_2$=0.06
$Na/SiO_2$=0.06
$Na/K$=1.00
$H_2O/SiO_2$=15.0
$OH/SiO_2$=0.12
Seed crystal=0.0% by weight The raw-material composition was charged in an airtight container with an internal volume of 80 mL and allowed to react at 150° C. for 48 hours while the container was rotated and stirred at 55 rpm. The resulting product was subjected to solid-liquid separation, washed with deionized water, and then dried at 110° C.

The product was a single-phase CHA-type zeolite and had a crystallinity of 124%. The FWHM of the XRD peak due to the 100 reflection was 0.160°, and the FWHM of the XRD peak due to the 20-1 reflection was 0.179°. $I_{1000}/I_{600}$ was 0.55.

Example A-2

A product was obtained by the same method as in Example A-1 except that the compositions described below were changed in the raw-material mixture.
$DMECHABr/SiO_2=0.075$
$TMAdCl/SiO_2=0.005$
The product was a single-phase CHA-type zeolite. The FWHM of the XRD peak due to the 100 reflection was 0.164°, and the FWHM of the XRD peak due to the 20-1 reflection was 0.173°. $I_{1000}/I_{600}$ was 0.59.

Example A-3

A product was obtained by the same method as in Example A-1 except that an amorphous aluminosilicate having a $SiO_2/Al_2O_3$ of 31.0 was used as the alumina source, TMAdOH was used instead of TMAdCl, and the compositions described below were changed in the raw-material mixture.
$SiO_2/Al_2O_3=31.0$
$TMAdOH/SiO_2=0.02$
$K/SiO_2=0.04$
The product was a single-phase CHA-type zeolite. The FWHM of the XRD peak due to the 100 reflection was 0.172°, and the FWHM of the XRD peak due to the 20-1 reflection was 0.183°. $I_{1000}/I_{600}$ was 0.59.

Example A-4

A product was obtained by the same method as in Example A-1 except that an amorphous aluminosilicate having a $SiO_2/Al_2O_3$ of 31.0 was used as the alumina source, DMECHABr and DMECHAOH were used instead of DMECHABr, TMAdOH was used instead of TMAdCl, and the compositions described below were changed in the raw-material mixture.
$SO_2/Al_2O_3=31.0$
$DMECHAOH/SiO_2=0.015$
$TMAdOH/SiO_2=0.005$
$K/SiO_2=0.04$
The product was a single-phase CHA-type zeolite. The FWHM of the XRD peak due to the 100 reflection was 0.169°, and the FWHM of the XRD peak due to the 20-1 reflection was 0.184°. $I_{1000}/I_{600}$ was 0.65.

Example A-5

A product was obtained by the same method as in Example A-1 except that an amorphous aluminosilicate having a $SiO_2/Al_2O_3$ of 24.5 was used as the alumina source, TMAdOH was used instead of TMAdCl, and the compositions described below were changed in the raw-material mixture.
$SiO_2/Al_2O_3=24.5$
$TMAdOH/SiO_2=0.02$
$Na/SiO_2=0.08$
$K/SiO_2=0.12$
$H_2O/SiO_2=18.0$
$OH/SiO_2=0.22$
The product was a single-phase CHA-type zeolite.

Comparative Example A-1

A product was obtained by the same method as in Example A-1 except that DMECHABr was not used and the compositions described below were changed in the raw-material mixture.
$DMECHABr/SiO_2=0$
$TMAdCl/SiO_2=0.080$
The product was a single-phase CHA-type zeolite, and $I_{1000}/I_{600}$ was 0.29.

TABLE 1

| | Raw-material composition | | | | | | |
|---|---|---|---|---|---|---|---|
| | $SiO_2/$ $Al_2O_3$ | $Na/$ $SiO_2$ | $K/$ $SiO_2$ | $DMECHABr/$ $SiO_2$ | $DMECHAOH/$ $SiO_2$ | $TMAdCl/$ $SiO_2$ | $TMAdOH/$ $SiO_2$ |
| Example A-1 | 23.7 | 0.06 | 0.06 | 0.060 | | 0.020 | |
| Example A-2 | 23.7 | 0.06 | 0.06 | 0.075 | | 0.005 | |
| Example A-3 | 31.0 | 0.06 | 0.04 | 0.060 | | | 0.020 |
| Example A-4 | 31.0 | 0.06 | 0.04 | 0.060 | 0.015 | | 0.005 |
| Example A-5 | 24.5 | 0.08 | 0.12 | 0.060 | | | 0.020 |
| Comparative Example A-1 | 23.7 | 0.06 | 0.06 | | | 0.08 | |

| | Raw-material composition | | | | | | |
|---|---|---|---|---|---|---|---|
| | ADA/MECHA | MECHA/ $SiO_2$ | ADA/$SiO_2$ | OSDA/ $SiO_2$ | Seed crystal (%) | $H_2O/$ $SiO_2$ | $OH/SiO_2$ |
| Example A-1 | 0.33 | 0.060 | 0.020 | 0.08 | 0.0 | 15.0 | 0.12 |
| Example A-2 | 0.07 | 0.075 | 0.005 | 0.08 | 0.0 | 15.0 | 0.12 |
| Example A-3 | 0.33 | 0.060 | 0.020 | 0.08 | 0.0 | 15.0 | 0.12 |
| Example A-4 | 0.07 | 0.075 | 0.005 | 0.08 | 0.0 | 15.0 | 0.12 |
| Example A-5 | 0.33 | 0.060 | 0.020 | 0.08 | 0.0 | 18.0 | 0.22 |
| Comparative Example A-1 | | 0 | 0.08 | 0.08 | 0.0 | 15.0 | 0.12 |

TABLE 2

| | Crystal phase | CHA crystallinity (%) | Product SiO$_2$/Al$_2$O$_3$ | Si yield (%) | Ratio SiOH/Si ($\times 10^{-2}$) |
|---|---|---|---|---|---|
| Example A-1 | CHA | 124 | 23.2 | 98 | 0.74 |
| Example A-2 | CHA | 124 | 23.3 | 98 | 0.72 |
| Example A-3 | CHA | 115 | 30.4 | 98 | 0.98 |
| Example A-4 | CHA | 122 | 30.5 | 98 | — |
| Example A-5 | CHA | 125 | 24.0 | 98 | 0.88 |
| Comparative Example A-1 | CHA | 123 | 23.0 | 97 | 1.20 |

*The symbol "—" in the table represents "unmeasured".

The Examples each provided a single phase of a CHA-type zeolite and achieved a Si yield equal to or higher than that of the Comparative Example in which an ADA salt was used alone as the OSDA. Accordingly, it was confirmed that a CHA-type zeolite was obtained by using an ADA salt and a MECHA salt as the OSDA.

Referring to Examples A-1 and A-2 and Comparative Example A-1, it was confirmed that the CHA-type zeolites obtained by using a DMECHA salt as the OSDA each had a lower ratio SiOH/Si, that is, had less framework end portions than the zeolite obtained by using TMAd alone as the OSDA.

The CHA-type zeolite of the Example had a high $I_{1000}/I_{600}$ of 0.55 or more, which is equal to or higher than 0.30, whereas the CHA-type zeolite of Comparative Example A-1 had an $I_{1000}/I_{600}$ of 0.29. Furthermore, the CHA-type zeolite of Comparative Example A-1 had a lower $I_{1000}/I_{600}$ than Example A-3, although the CHA crystallinity of Comparative Example A-1 was higher than that of Example A-3. These results showed that the CHA-type zeolites according to the present invention had higher heat resistance than the CHA-type zeolite obtained by using an ADA salt alone as the OSDA.

Example B-1

The 25 wt % aqueous DMECHABr solution, a 25 wt % aqueous TMAdCl solution, a 48 wt % aqueous sodium hydroxide solution, a 48 wt % aqueous potassium hydroxide solution, deionized water and an amorphous aluminosilicate (SiO$_2$/Al$_2$O$_3$=25.7) were mixed to prepare 50.0 g of a raw-material composition having the molar compositions described below.
SiO$_2$/Al$_2$O$_3$=25.7
OSDA/SiO$_2$=0.08
DMECHABr/SiO$_2$=0.04
TMAdCl/SiO$_2$=0.04
TMAdCl/DMECHABr=1.00
K/SiO$_2$=0.10
Na/SiO$_2$=0.10
Na/K=1.00
H$_2$O/SiO$_2$=15.0
OH/SiO$_2$=0.20
Seed crystal=0.0% by weight The raw-material composition was charged in an airtight container with an internal volume of 80 mL and allowed to react at 170° C. for 48 hours while the container was rotated and stirred at 55 rpm. The resulting product was subjected to solid-liquid separation, washed with deionized water, and then dried at 110° C.

The product was a single-phase CHA-type zeolite and had a CHA crystallinity of 118%. SiO$_2$/Al$_2$O$_3$ was 24.9.

Example B-2

A product was obtained by the same method as in Example B-1 except that the K/SiO$_2$ was 0.06.

The product was a single-phase CHA-type zeolite and had a CHA crystallinity of 129%. SiO$_2$/Al$_2$O$_3$ was 25.2.

Example B-3

A product was obtained by the same method as in Example B-2 except that the 25 wt % aqueous DMECHAOH solution was used instead of the 25 wt % aqueous DMECHABr solution, and a 25 wt % aqueous TMAdOH solution was used instead of the 25 wt % aqueous TMAdCl solution.

The product was a single-phase CHA-type zeolite and had a CHA crystallinity of 118%. SiO$_2$/Al$_2$O$_3$ was 23.8.

Example B-4

A product was obtained by the same method as in Example B-1 except that the 25 wt % aqueous MDECHAI solution was used instead of the 25 wt % aqueous DMECHABr solution.

The product was a single-phase CHA-type zeolite and had a CHA crystallinity of 112%. SiO$_2$/Al$_2$O$_3$ was 24.7.

Comparative Example B-1

A product was obtained by the same method as in Example B-1 except that the 25 wt % aqueous DMECHABr solution was used alone as the OSDA, and a CHA-type zeolite was mixed as a seed crystal in an amount of 5% by weight in the raw-material composition.

Crystallization did not occur in this Comparative Example even after the reaction for 48 hours, and the product was amorphous.

Comparative Example B-2

A product was obtained by the same method as in Example B-1 except that the 25 wt % aqueous DMECHAOH solution was used alone as the OSDA, and a CHA-type zeolite was mixed as a seed crystal in an amount of 5% by weight in the raw-material composition.

Crystallization did not occur in this Comparative Example even after the reaction for 48 hours, and the product was amorphous.

These Comparative Examples show that a CHA-type zeolite is not generated within 48 hours when DMECHA$^+$ is used alone as the OSDA.

Comparative Example B-3

A product was obtained by the same method as in Example B-1 except that a 25 wt % aqueous TMAdCl solution was used alone as the OSDA.

The product was a single-phase CHA-type zeolite and had a CHA crystallinity of 100%. $SiO_2/Al_2O_3$ was 24.2, and $I_{1000}/I_{600}$ was lower than 0.30.

Comparative Example B-4

A product was obtained by the same method as in Example B-1 except that a 25 wt % aqueous TMAdOH solution was used alone as the OSDA.

The product was a single-phase CHA-type zeolite and had a CHA crystallinity of 100%. $SiO_2/Al_2O_3$ was 22.1, and $I_{1000}/I_{600}$ was lower than 0.30.

These Comparative Examples show that when $TMAd^+$ is used alone as the OSDA, the CHA crystallinity is lower than that in the system in which $MECHA^+$ and $TMAd^+$ are used in combination. In addition, the OSDA cost is high due to a large amount of $TMAd^+$ added in these Comparative Examples.

Table 3 shows main compositions of the raw-material compositions of the Examples and Comparative Examples, and Table 4 shows the results of the products.

TABLE 3

| | Raw-material composition | | | | | | |
|---|---|---|---|---|---|---|---|
| | $SiO_2/$ $Al_2O_3$ | $Na/$ $SiO_2$ | $K/$ $SiO_2$ | DMECHABr/ $SiO_2$ | DMECHAOH/ $SiO_2$ | MDECHAI/ $SiO_2$ | TMAdCl/ $SiO_2$ |
| Example B-1 | 25.7 | 0.10 | 0.10 | 0.04 | | | 0.04 |
| Example B-2 | 25.7 | 0.10 | 0.06 | 0.04 | | | 0.04 |
| Example B-3 | 25.7 | 0.10 | 0.06 | | 0.04 | | |
| Example B-4 | 25.7 | 0.10 | 0.10 | | | 0.04 | 0.04 |
| Comparative Example B-1 | 25.7 | 0.10 | 0.10 | 0.08 | | | |
| Comparative Example B-2 | 25.7 | 0.10 | 0.10 | | 0.08 | | |
| Comparative Example B-3 | 25.7 | 0.10 | 0.10 | | | | 0.08 |
| Comparative Example B-4 | 25.7 | 0.10 | 0.10 | | | | |

| | Raw-material composition | | | | | | |
|---|---|---|---|---|---|---|---|
| | TMAdOH/ $SiO_2$ | ADA/ MECHA | MECHA/ $SiO_2$ | ADA/ $SiO_2$ | OSDA/ $SiO_2$ | Seed crystal (%) | $H_2O/SiO_2$ |
| Example B-1 | | 1.00 | 0.04 | 0.04 | 0.08 | 0.0 | 15.0 |
| Example B-2 | | 1.00 | 0.04 | 0.04 | 0.08 | 0.0 | 15.0 |
| Example B-3 | 0.04 | 1.00 | 0.04 | 0.04 | 0.08 | 0.0 | 15.0 |
| Example B-4 | | 1.00 | 0.04 | 0.04 | 0.08 | 0.0 | 15.0 |
| Comparative Example B-1 | | | 0.08 | 0 | 0.08 | 5.0 | 15.0 |
| Comparative Example B-2 | | | 0.08 | 0 | 0.08 | 5.0 | 15.0 |
| Comparative Example B-3 | | | 0 | 0.08 | 0.08 | 0.0 | 15.0 |
| Comparative Example B-4 | 0.08 | | 0 | 0.08 | 0.08 | 0.0 | 15.0 |

TABLE 4

| | Crystal phase | CHA crystallinity (%) | SiO$_2$/Al$_2$O$_3$ | Si yield (%) |
|---|---|---|---|---|
| Example B-1 | CHA | 118 | 24.9 | 97 |
| Example B-2 | CHA | 129 | 25.2 | 98 |
| Example B-3 | CHA | 118 | 23.8 | 93 |
| Example B-4 | CHA | 112 | 24.7 | 96 |
| Comparative Example B-1 | Amorphous | — | — | — |
| Comparative Example B-2 | Amorphous | — | — | — |
| Comparative Example B-3 | CHA | 100 | 24.2 | 94 |
| Comparative Example B-4 | CHA | 100 | 22.1 | 86 |

*The symbol "—" in the table represents "unmeasured".

Example B-5

The 25 wt % aqueous DMECHABr solution, a 25 wt % aqueous TMAdCl solution, a 48 wt % aqueous sodium hydroxide solution, a 48 wt % aqueous potassium hydroxide solution, deionized water and an amorphous aluminosilicate (SiO$_2$/Al$_2$O$_3$=25.7) were mixed to prepare 50.0 g of a raw-material composition having the molar compositions described below.

SiO$_2$/Al$_2$O$_3$=25.7
OSDA/SiO$_2$=0.08
DMECHABr/SiO$_2$=0.06
TMAdCl/SiO$_2$=0.02
TMAdCl/DMECHABr=0.33
K/SiO$_2$=0.06
Na/SiO$_2$=0.10
Na/K=1.67
H$_2$O/SiO$_2$=15.0
OH/SiO$_2$=0.16
Seed crystal=0.0% by weight The raw-material composition was charged in an airtight container with an internal volume of 80 mL and allowed to react at 170° C. for 48 hours while the container was rotated and stirred at 55 rpm. The resulting product was subjected to solid-liquid separation, washed with deionized water, and then dried at 110° C.

The product was a single-phase CHA-type zeolite and had a CHA crystallinity of 132%. SiO$_2$/Al$_2$O$_3$ was 25.1, and I$_{1000}$/I$_{600}$ was less than 0.35.

Example B-6

A product was obtained by the same method as in Example B-5 except that the DMECHABr/SiO$_2$ and the TMAdCl/SiO$_2$ in the raw-material composition were 0.07 and 0.01, respectively.

The product was a single-phase CHA-type zeolite and had a CHA crystallinity of 130%. SiO$_2$/Al$_2$O$_3$ was 24.9, the ratio SiOH/Si was 0.54, and I$_{1000}$/I$_{600}$ was 0.42.

Example B-7

A product was obtained by the same method as in Example B-5 except that the DMECHABr/SiO$_2$ and the TMAdCl/SiO$_2$ were 0.07 and 0.01, respectively, and a CHA-type zeolite was mixed as a seed crystal in an amount of 2% by weight in the raw-material composition.

The product was a single-phase CHA-type zeolite and had a CHA crystallinity of 129%. SiO$_2$/Al$_2$O$_3$ was 24.7, and I$_{1000}$/I$_{600}$ was 0.41.

Table 5 shows main compositions of the raw-material compositions of the Examples, and Table 6 shows the results of the products. These Examples show that highly crystalline CHA-type zeolites are obtained even when the amount of TMAd$^+$ used is decreased.

TABLE 5

| | Raw-material composition | | | | | | | | | | | |
|---|---|---|---|---|---|---|---|---|---|---|---|---|
| | SiO$_2$/Al$_2$O$_3$ | Na/SiO$_2$ | K/SiO$_2$ | DMECHABr/SiO$_2$ | TMAdCl/SiO$_2$ | ADA/MECHA | MECHA/SiO$_2$ | ADA/SiO$_2$ | OSDA/SiO$_2$ | Seed crystal (%) | H$_2$O/SiO$_2$ | OH/SiO$_2$ |
| Example B-5 | 25.7 | 0.10 | 0.06 | 0.06 | 0.02 | 0.333 | 0.06 | 0.02 | 0.08 | 0.0 | 15.0 | 0.16 |
| Example B-6 | 25.7 | 0.10 | 0.06 | 0.07 | 0.01 | 0.142 | 0.07 | 0.01 | 0.08 | 0.0 | 15.0 | 0.16 |
| Example B-7 | 25.7 | 0.10 | 0.06 | 0.07 | 0.01 | 0.142 | 0.07 | 0.01 | 0.08 | 2.0 | 15.0 | 0.16 |

TABLE 6

| | Product | | | |
|---|---|---|---|---|
| | Crystal phase | CHA crystallinity (%) | SiO$_2$/Al$_2$O$_3$ | Si yield (%) |
| Example B-5 | CHA | 132 | 25.1 | 98 |
| Example B-6 | CHA | 130 | 24.9 | 97 |
| Example B-7 | CHA | 129 | 24.7 | 96 |

Example B-8

A product was obtained by the same method as in Example B-2 except that the reaction temperature was 150° C.

The product was a single-phase CHA-type zeolite and had a CHA crystallinity of 129%. The ratio SiO$_2$/Al$_2$O$_3$ was 24.9.

The CHA-type zeolite of this Example was found to contain aggregate crystal particles in which primary crystal particles each having a side of 1 chemically aggregated.

Example B-9

A product was obtained by the same method as in Example B-5 except that the reaction temperature was 150° C.

The product was a single-phase CHA-type zeolite and had a CHA crystallinity of 132%. SiO$_2$/Al$_2$O$_3$ was 25.2, and I$_{1000}$/I$_{600}$ was 0.38.

It was found that the CHA-type zeolite of this Example contained primary crystal particles each having a side of 1 µm in a large amount, and the primary crystal particles and aggregate crystal particles in which primary particles chemically aggregated were present.

Example B-10

A product was obtained by the same method as in Example B-9 except that a 25 wt % aqueous TMAdOH solution was used instead of the 25 wt % aqueous TMAdCl solution.

The product was a single-phase CHA-type zeolite and had a CHA crystallinity of 129%. $SiO_2/Al_2O_3$ was 23.9, and $I_{1000}/I_{600}$ was 0.32.

It was found that the CHA-type zeolite of this Example contained primary crystal particles each having a side of 1 µm in a large amount, and the primary crystal particles and aggregate crystal particles in which primary particles chemically aggregated were present.

Example B-11

A product was obtained by the same method as in Example B-9 except that the 25 wt % aqueous MDECHAI solution was used instead of the 25 wt % aqueous DMECHABr solution.

The product was a single-phase CHA-type zeolite and had a CHA crystallinity of 120%. $SiO_2/Al_2O_3$ was 24.9.

Table 7 shows main compositions of the raw-material compositions of the Examples, and Table 8 shows the results of the products. These Examples show that highly crystalline CHA-type zeolites are obtained within a short time (48 hours) even when the reaction temperature is decreased to 150° C.

TABLE 8

| | Product | | | |
|---|---|---|---|---|
| | Crystal phase | CHA crystallinity (%) | $SiO_2/Al_2O_3$ | Si yield (%) |
| Example B-8 | CHA | 129 | 24.9 | 97 |
| Example B-9 | CHA | 132 | 25.2 | 98 |
| Example B-10 | CHA | 129 | 23.9 | 93 |
| Example B-11 | CHA | 120 | 24.9 | 97 |

Comparative Example B-5

A product was obtained by the same method as in Example B-1 except that a 25 wt % aqueous N,N,N-trimethylcyclohexylammonium iodide (hereinafter also referred to as "TMCHAI") solution was used instead of the 25 wt % aqueous DMECHABr solution, and a CHA-type zeolite was mixed as a seed crystal in an amount of 5% by weight in the raw-material composition.

The product obtained above was a mixture of a CHA-type zeolite and an ERI-type zeolite, and the CHA crystallinity in the mixture was 99%. The ratio $SiO_2/Al_2O_3$ of the mixture was 24.8, and $I_{1000}/I_{600}$ was lower than 0.30.

Comparative Example B-6

A product was obtained by the same method as in Comparative Example B-5 except that the $TMCHAI/SiO_2$ and the $TMAdCl/SiO_2$ were 0.06 and 0.02, respectively.

Crystallization did not occur in this Comparative Example even after the reaction for 48 hours, and the product was amorphous.

TABLE 7

| | Raw-material composition | | | | | | |
|---|---|---|---|---|---|---|---|
| | $SiO_2/Al_2O_3$ | $Na/SiO_2$ | $K/SiO_2$ | $DMECHABr/SiO_2$ | $MDECHAI/SiO_2$ | $TMAdCl/SiO_2$ | $TMAdOH/SiO_2$ |
| Example B-8 | 25.7 | 0.10 | 0.06 | 0.04 | | 0.04 | |
| Example B-9 | 25.7 | 0.10 | 0.06 | 0.06 | | 0.02 | |
| Example B-10 | 25.7 | 0.10 | 0.06 | 0.06 | | | 0.02 |
| Example B-11 | 25.7 | 0.10 | 0.06 | | 0.06 | 0.02 | |

| | Raw-material composition | | | | | |
|---|---|---|---|---|---|---|
| | ADA/MECHA | $MECHA/SiO_2$ | $ADA/SiO_2$ | $OSDA/SiO_2$ | Seed crystal (%) | $H_2O/SiO_2$ | $OH/SiO_2$ |
| Example B-8 | 1.00 | 0.04 | 0.04 | 0.08 | 0.0 | 15.0 | 0.16 |
| Example B-9 | 0.33 | 0.06 | 0.02 | 0.08 | 0.0 | 15.0 | 0.16 |
| Example B-10 | 0.33 | 0.06 | 0.02 | 0.08 | 0.0 | 15.0 | 0.18 |
| Example B-11 | 0.33 | 0.06 | 0.02 | 0.08 | 0.0 | 15.0 | 0.16 |

Comparative Example B-7

A product was obtained by the same method as in Comparative Example B-6 except that a 25 wt % aqueous TMAdOH solution was used instead of the 25 wt % aqueous TMAdCl solution.

Crystallization did not occur in this Comparative Example even after the reaction for 48 hours, and the product was amorphous.

Comparative Example B-8

A product was obtained by the same method as in Example B-1 except that a 25 wt % aqueous N,N,N-dimethylpropylcyclohexylammonium bromide (hereinafter also referred to as "DMPCHABr") solution was used instead of the 25 wt % aqueous DMECHABr solution, and a CHA-type zeolite was mixed as a seed crystal in an amount of 5% by weight in the raw-material composition.

The product obtained above was a mixture of a CHA-type zeolite and an ERI-type zeolite, and the CHA crystallinity in the mixture was 72%. The ratio $SiO_2/Al_2O_3$ of the mixture was 24.5.

Comparative Example B-9

A product was obtained by the same method as in Example B-1 except that a 25 wt % aqueous N,N,N-trimethylbenzylammonium bromide (hereinafter also referred to as "TMBABr") solution was used instead of the 25 wt % aqueous DMECHABr solution, and a CHA-type zeolite was mixed as a seed crystal in an amount of 5% by weight in the raw-material composition.

The product obtained above was a mixture of a CHA-type zeolite and an ERI-type zeolite, and the CHA crystallinity in the mixture was 100%. The ratio $SiO_2/Al_2O_3$ of the mixture was 25.0, and $I_{1000}/I_{600}$ was lower than 0.30.

Table 9 shows main compositions of the raw-material compositions of the Comparative Examples, and Table 10 shows the results of the products.

TABLE 9

| | Raw-material composition | | | | | | |
|---|---|---|---|---|---|---|---|
| | $SiO_2/Al_2O_3$ | Na/$SiO_2$ | K/$SiO_2$ | TMCHAI/$SiO_2$ | DMPCHABr/$SiO_2$ | TMBABr/$SiO_2$ | TMAdCl/$SiO_2$ |
| Comparative Example B-5 | 25.7 | 0.10 | 0.10 | 0.04 | | | 0.04 |
| Comparative Example B-6 | 25.7 | 0.10 | 0.06 | 0.06 | | | 0.02 |
| Comparative Example B-7 | 25.7 | 0.10 | 0.06 | 0.06 | | | |
| Comparative Example B-8 | 25.7 | 0.10 | 0.10 | | 0.04 | | 0.04 |
| Comparative Example B-9 | 25.7 | 0.10 | 0.10 | | | 0.04 | 0.04 |

| | Raw-material composition | | | | | | | |
|---|---|---|---|---|---|---|---|---|
| | TMAdOH/$SiO_2$ | ADA/MECHA | MECHA/$SiO_2$ | ADA/$SiO_2$ | OSDA/$SiO_2$ | Seed crystal (%) | $H_2O$/$SiO_2$ | OH/$SiO_2$ |
| Comparative Example B-5 | | 1.00 | 0.04 | 0.04 | 0.08 | 5.0 | 15.0 | 0.20 |
| Comparative Example B-6 | | 0.33 | 0.06 | 0.02 | 0.08 | 5.0 | 15.0 | 0.16 |
| Comparative Example B-7 | 0.02 | 0.33 | 0.06 | 0.02 | 0.08 | 5.0 | 15.0 | 0.18 |
| Comparative Example B-8 | | 1.00 | 0 | 0.04 | 0.08 | 5.0 | 15.0 | 0.20 |
| Comparative Example B-9 | | 1.00 | 0 | 0.04 | 0.08 | 5.0 | 15.0 | 0.20 |

TABLE 10

| | Product | | | |
|---|---|---|---|---|
| | Crystal phase | CHA crystallinity (%) | $SiO_2/Al_2O_3$ | Si yield (%) |
| Comparative Example B-5 | CHA + ERI | 99 | 24.8 | 96 |
| Comparative Example B-6 | Amorphous | — | — | — |
| Comparative Example B-7 | Amorphous | — | — | — |
| Comparative Example B-8 | CHA + ERI | 72 | 24.5 | 95 |
| Comparative Example B-9 | CHA + ERI | 100 | 25.0 | 97 |

*The symbol "—" in the table represents "unmeasured".

These Comparative Examples showed that raw-material compositions including an ADA salt and an N,N,N-trialkyl-cyclohexylammonium salt other than a MECHA salt could not achieve crystallization of a single phase of a CHA-type zeolite. It was found that the raw-material composition including an ADA salt and TMBABr, which is a quaternary ammonium salt including an aromatic ring, also could not achieve crystallization of a single phase of a CHA-type zeolite. $I_{1000}/I_{600}$ of Comparative Example B-9 was lower than 0.30. This showed that a mixture of a CHA-type zeolite and a zeolite other than a CHA-type zeolite did not have high heat resistance even when the CHA-type zeolite had high crystallinity.

Example C-1

The 25 wt % aqueous DMECHABr solution, the 25 wt % aqueous DMECHAOH solution, a 48% aqueous sodium hydroxide solution, a 48 wt % aqueous potassium hydroxide solution, deionized water and an amorphous aluminosilicate ($SiO_2/Al_2O_3$=18.3) were mixed to prepare a raw-material composition having the molar compositions described below.

$SiO_2/Al_2O_3$=18.3
DMECHABr/$SiO_2$=0.07
DMECHAOH/$SiO_2$=0.01
K/$SiO_2$=0.11
Na/$SiO_2$=0.04
$H_2O$/$SiO_2$=15.0
OH/$SiO_2$=0.16
Seed crystal=0.0% by weight The raw-material composition was charged in an airtight container with an internal volume of 80 mL and allowed to react at 150° C. for 48 hours while the container was rotated and stirred at 55 rpm. The resulting product was subjected to solid-liquid separation, washed with deionized water, and then dried at 110° C. The product was a single-phase CHA-type zeolite and had an $I_{1000}/I_{600}$ of 0.16.

Example C-2

The 25 wt % aqueous DMECHABr solution, the 25 wt % aqueous DMECHAOH solution, a 48 wt % aqueous sodium hydroxide solution, a 48 wt % aqueous potassium hydroxide solution, deionized water and an amorphous aluminosilicate ($SiO_2/Al_2O_3$=24.6) were mixed to prepare a raw-material composition having the molar compositions described below.

$SiO_2/Al_2O_3$=24.6
DMECHABr/$SiO_2$=0.04
DMECHAOH/$SiO_2$=0.04
Na/$SiO_2$=0.04
K/$SiO_2$=0.08
$H_2O$/$SiO_2$=15.0
OH/$SiO_2$=0.16
Seed crystal=0.0% by weight A product was obtained by performing crystallization by the same method as in Example C-1 except that the raw-material composition prepared above was used. The product obtained above was a single-phase CHA-type zeolite. The FWHM of the XRD peak due to the 100 reflection was 0.196°, and the FWHM of the XRD peak due to the 20-1 reflection was 0.191°. $I_{1000}/I_{600}$ was 0.59.

Example C-3

The 25 wt % aqueous DMECHABr solution, the 25 wt % aqueous DMECHAOH solution, a 48 wt % aqueous sodium hydroxide solution, a 48 wt % aqueous potassium hydroxide solution, deionized water and an amorphous aluminosilicate ($SiO_2/Al_2O_3$=40.0) were mixed to prepare a raw-material composition having the molar compositions described below.

$SiO_2/Al_2O_3$=40.0
DMECHABr/$SiO_2$=0.02
DMECHAOH/$SiO_2$=0.06
Na/$SiO_2$=0.06
K/$SiO_2$=0.04
$H_2O$/$SiO_2$=15.0
OH/$SiO_2$=0.16
Seed crystal=2.0% by weight A product was obtained by performing crystallization by the same method as in Example C-1 except that the raw-material composition prepared above was used. The product obtained above was a single-phase CHA-type zeolite and had an $I_{1000}/I_{600}$ of 0.76.

Example C-4

The 25 wt % aqueous DMECHAOH solution, a 48 wt % aqueous sodium hydroxide solution, a 48 wt % aqueous potassium hydroxide solution, deionized water and an amorphous aluminosilicate ($SiO_2/Al_2O_3$=50.7) were mixed to prepare 50.0 g of a raw-material composition having the molar compositions described below.

$SO_2/Al_2O_3$=50.7
DMECHABr/$SiO_2$=0.05
DMECHAOH/$SiO_2$=0.05
Na/$SiO_2$=0.08
K/$SiO_2$=0.03
$H_2O$/$SiO_2$=15.0
OH/$SiO_2$=0.16
Seed crystal=2.0% by weight A product was obtained by performing crystallization by the same method as in Example C-1 except that the raw-material composition prepared above was used, and the reaction temperature was 170° C. The product obtained above was a single-phase CHA-type zeolite and had an $I_{1000}/I_{600}$ of 0.51.

Example C-5

The 25 wt % aqueous DMECHABr solution, the 25 wt % aqueous DMECHAOH solution, a 48 wt % aqueous sodium hydroxide solution, a 48 wt % aqueous potassium hydroxide solution, deionized water and an amorphous aluminosilicate ($SiO_2/Al_2O_3$=24.6) were mixed to prepare 50.0 g of a raw-material composition having the molar compositions described below.

$SiO_2/Al2O_3$=24.6
DMECHABr/$SiO_2$=0.02
DMECHAOH/$SiO_2$=0.06
Na/$SiO_2$=0.04
K/$SiO_2$=0.10
$H_2O$/$SiO_2$=15.0
OH/$SiO_2$=0.20
Seed crystal=0.0% by weight A product was obtained by performing crystallization by the same method as in Example C-1 except that the raw-material composition prepared above was used. The product obtained above was a single-phase CHA-type zeolite and had an $I_{1000}/I_{600}$ of 0.35.

Example C-6

The 25 wt % aqueous DMECHAOH solution, a 48 wt % aqueous sodium hydroxide solution, a 48 wt % aqueous potassium hydroxide solution, deionized water and an amorphous aluminosilicate ($SiO_2/Al_2O_3$=24.6) were mixed to prepare 50.0 g of a raw-material composition having the molar compositions described below.

$SiO_2/Al_2O_3$=24.6
DMECHAOH/$SiO_2$=0.08
Na/$SiO_2$=0.04
K/$SiO_2$=0.12
$H_2O$/$SiO_2$=15.0
OH/$SiO_2$=0.24
Seed crystal=0.0% by weight A product was obtained by performing crystallization by the same method as in Example C-1 except that the raw-material composition prepared above was used. The product obtained above was a single-phase CHA-type zeolite and had an $I_{1000}/I_{600}$ of 0.16.

Example C-7

The 25 wt % aqueous DMECHABr solution, the 25 wt % aqueous DMECHAOH solution, a 48 wt % aqueous sodium hydroxide solution, a 48 wt % aqueous potassium hydroxide solution, deionized water, silica gel (product name: Nipsil-VN3, available from Nippon Silica Kogyo Co., Ltd.), aluminum isopropoxide (available from Kishida Chemical Co., Ltd.) and SSZ-13 serving as a seed crystal were mixed to prepare a raw-material composition having the molar compositions described below.

$SiO_2/Al_2O_3$=35.0
DMECHABr/$SiO_2$=0.065
DMECHAOH/$SiO_2$=0.015
Na/$SiO_2$=0.060
K/$SiO_2$=0.045
$H_2O$/$SiO_2$=15.0
OH/$SiO_2$=0.12
Seed crystal=2.0% by weight A product was obtained by performing crystallization by the same method as in Example C-1 except that the raw-material composition prepared above was used, and the temperature was 170° C. The product obtained above was a single-phase CHA-type zeolite and had an $I_{1000}/I_{600}$ of 0.52.

Comparative Example C-1

Crystallization was performed by the same method as in Example C-1 except that a raw-material composition having the molar compositions described below was used.
$SiO_2/Al_2O_3$=24.6
DMECHABr/$SiO_2$=0.08
Na/$SiO_2$=0.125
K/$SiO_2$=0.08
$H_2O$/$SiO_2$=15.0
OH/$SiO_2$=0.205
Seed crystal=0.0% by weight However, the raw-material composition did not crystallize, and the resulting product was amorphous.

Comparative Example C-2

Crystallization was performed by the same method as in Example C-1 except that a raw-material composition having the molar compositions described below was used.
$SiO_2/Al_2O_3$=40.0
DMECHABr/$SiO_2$=0.08
Na/$SiO_2$=0.125
K/$SiO_2$=0.04
$H_2O$/$SiO_2$=15.0
OH/$SiO_2$=0.165
Seed crystal=0.0% by weight However, the raw-material composition did not crystallize, and the resulting product was amorphous.

Table 11 shows main compositions of the raw-material compositions of the Examples and Comparative Examples, and Table 12 shows the products.

TABLE 11

| | Raw-material composition | | | | | | | | |
|---|---|---|---|---|---|---|---|---|---|
| | $SiO_2/$ $Al_2O_3$ | Na/ $SiO_2$ | K/ $SiO_2$ | DMECHABr/ $SiO_2$ | DMECHAOH/ $SiO_2$ | OSDA/ $SiO_2$ | Seed crystal (%) | $H_2O$/ $SiO_2$ | OH/ $SiO_2$ |
| Example C-1 | 18.3 | 0.040 | 0.110 | 0.070 | 0.010 | 0.080 | 0.0 | 15.0 | 0.16 |
| Example C-2 | 24.6 | 0.040 | 0.080 | 0.040 | 0.040 | 0.080 | 0.0 | 15.0 | 0.16 |
| Example C-3 | 40.0 | 0.060 | 0.040 | 0.020 | 0.060 | 0.080 | 2.0 | 15.0 | 0.16 |
| Example C-4 | 50.7 | 0.080 | 0.030 | 0.050 | 0.050 | 0.100 | 2.0 | 15.0 | 0.16 |
| Example C-5 | 24.6 | 0.040 | 0.100 | 0.020 | 0.060 | 0.080 | 0.0 | 15.0 | 0.20 |
| Example C-6 | 24.6 | 0.040 | 0.120 | | 0.080 | 0.080 | 0.0 | 15.0 | 0.24 |
| Example C-7 | 35.0 | 0.060 | 0.045 | 0.065 | 0.015 | 0.080 | 2.0 | 15.0 | 0.12 |
| Comparative Example C-1 | 24.6 | 0.125 | 0.080 | 0.080 | | 0.080 | 0.0 | 15.0 | 0.205 |
| Comparative Example C-2 | 40.0 | 0.125 | 0.040 | 0.080 | | 0.080 | 0.0 | 15.0 | 0.165 |

TABLE 12

| | Product | | | | |
|---|---|---|---|---|---|
| | Crystal phase | CHA crystallinity (%) | $SiO_2/$ $Al_2O_3$ | Si yield (%) | Ratio SiOH/Si ($\times 10^{-2}$) |
| Example C-1 | CHA | 109 | 17.9 | 98 | 0.39 |
| Example C-2 | CHA | 130 | 23.3 | 98 | 0.69 |
| Example C-3 | CHA | 122 | 37.0 | 93 | 1.20 |
| Example C-4 | CHA | 130 | 48.7 | 96 | 1.72 |
| Example C-5 | CHA | 120 | 23.0 | 93 | — |
| Example C-6 | CHA | 120 | 21.6 | 88 | — |
| Example C-7 | CHA | 117 | 29.5 | 84 | — |
| Comparative Example C-1 | Amorphous | — | — | — | — |
| Comparative Example C-2 | Amorphous | — | — | — | — |

*The symbol "—" in the table represents "unmeasured".

DMECHA salts were used as the OSDA in the Examples and Comparative Examples. A single phase of a CHA-type zeolite was obtained in each of the Examples. In contrast, no CHA-type zeolite crystalized in each of the Comparative Examples in which a raw-material composition having a high Na/SiO$_2$ was used.

The CHA-type zeolites obtained in the Examples had an $I_{1000}/I_{600}$ of more than 0.30 and were found to have good heat resistance.

Comparative Example C-3

50.0 g of a raw-material composition was prepared as in Example C-1 except that a 25 wt % aqueous N,N,N-trimethylcyclohexylammonium iodide (TMCHAI) solution and a 25 wt % aqueous N,N,N-trimethylcyclohexylammonium hydroxide (TMCHAOH) solution were used as the OSDA.

SiO$_2$/Al$_2$O$_3$=24.6
TMCHAI/SiO$_2$=0.04
TMCHAOH/SiO$_2$=0.04
Na/SiO$_2$=0.04
K/SiO$_2$=0.08
H$_2$O/SiO$_2$=15.0
OH/SiO$_2$=0.16
Seed crystal=0.0% by weight Crystallization was performed by the same method as in Example C-1 except that the raw-material composition prepared above was used. However, the raw-material composition did not crystallize, and the resulting product was amorphous.

Comparative Example C-4

A raw-material composition was obtained in which the raw-material composition had the same composition as the raw-material composition of Comparative Example C-1 except that SSZ-13 was contained as a seed crystal in an amount of 2.0% by weight.

Crystallization was performed by the same method as in Example C-1 except that the raw-material composition prepared above was used. However, the raw-material composition did not crystallize, and an amorphous product was obtained.

Comparative Example C-5

A raw-material composition having the compositions described below was prepared by using a 25 wt % aqueous N,N,N-triethylcyclohexylammonium bromide (hereinafter also referred to as "TECHABr") solution and a 25 wt % N,N,N-triethylcyclohexylammonium hydroxide (hereinafter also referred to as "TECHAOH") solution as the OSDA.

SiO$_2$/Al$_2$O$_3$=24.6
TECHABr/SiO$_2$=0.04
TECHAOH/SiO$_2$=0.04
Na/SiO$_2$=0.04
K/SiO$_2$=0.08
H$_2$O/SiO$_2$=15.0
OH/SiO$_2$=0.16
Seed crystal=2.0% by weight Crystallization was performed by the same method as in Example C-1 except that the raw-material composition prepared above was used. However, the raw-material composition did not crystallize, and the resulting product was amorphous.

Table 13 shows main compositions of the raw-material compositions of the Comparative Examples.

TABLE 13

| | Raw-material composition | | | | | | | | | | |
|---|---|---|---|---|---|---|---|---|---|---|---|
| | SiO$_2$/Al$_2$O$_3$ | Na/SiO$_2$ | K/SiO$_2$ | TMCHAI/SiO$_2$ | TMCHAOH/SiO$_2$ | TECHABr/SiO$_2$ | TECHAOH/SiO$_2$ | OSDA/SiO$_2$ | Seed crystal (%) | H$_2$O/SiO$_2$ | OH/SiO$_2$ |
| Comparative Example C-3 | 24.6 | 0.040 | 0.080 | 0.040 | 0.040 | | | 0.080 | 0.0 | 15.0 | 0.16 |
| Comparative Example C-4 | 24.6 | 0.040 | 0.080 | 0.040 | 0.040 | | | 0.080 | 2.0 | 15.0 | 0.16 |
| Comparative Example C-5 | 24.6 | 0.040 | 0.080 | | | 0.040 | 0.040 | 0.080 | 2.0 | 15.0 | 0.16 |

A raw-material composition containing an N,N,N-trialkylcyclohexylammonium salt as the OSDA was used in each of the Comparative Examples. However, no CHA-type zeolites were verified in the Comparative Examples. This showed that the use of N,N,N-trialkylcyclohexylammonium salts other than DMECHA salts did not cause crystallization of a single phase of a CHA-type zeolite.

Comparative Example C-6

A raw-material composition having the compositions described below was prepared by using a 25 wt % aqueous N,N,N-trimethyladamantaneammonium chloride (hereinafter referred to as "TMAdCl") solution and N,N,N-trimethyladamantaneammonium hydroxide (hereinafter referred to as "TMAdOH") as the OSDA.

SiO$_2$/Al$_2$O$_3$=18.3
TMAdCl/SiO$_2$=0.04
TMAdOH/SiO$_2$=0.04
Na/SiO$_2$=0.04
K/SiO$_2$=0.11
H$_2$O/SiO$_2$=15.0
OH/SiO$_2$=0.16
Seed crystal=0.0% by weight Crystallization was performed by the same method as in Example C-1 except that the raw-material composition prepared above was used. The resulting product was a single-phase CHA-type zeolite and had an $I_{1000}/I_{600}$ of 0.10.

Comparative Example C-7

A raw-material composition having the compositions described below was prepared by using a 25 wt % aqueous N,N,N-trimethyladamantaneammonium chloride (hereinafter referred to as "TMAdCl") solution and N,N,N-trimethyladamantaneammonium hydroxide (hereinafter referred to as "TMAdOH") as the OSDA.

$SiO_2/Al_2O_3=24.6$
$TMAdCl/SiO_2=0.04$
$TMAdOH/SiO_2=0.04$
$Na/SiO_2=0.04$
$K/SiO_2=0.08$
$H_2O/SiO_2=15.0$
$OH/SiO_2=0.16$
Seed crystal=0.0% by weight Crystallization was performed by the same method as in Example C-1 except that the raw-material composition prepared above was used. The resulting product was a single-phase CHA-type zeolite and had an $I_{1000}/I_{600}$ of 0.24.

Comparative Example C-8

A raw-material composition having the compositions described below was prepared by using a 25 wt % aqueous N,N,N-trimethyladamantaneammonium chloride (hereinafter referred to as "TMAdCl") solution and N,N,N-trimethyladamantaneammonium hydroxide (hereinafter referred to as "TMAdOH") as the OSDA.

$SiO_2/Al_2O_3=40.0$
$TMAdCl/SiO_2=0.02$
$TMAdOH/SiO_2=0.06$
$Na/SiO_2=0.06$
$K/SiO_2=0.04$
$H_2O/SiO_2=15.0$
$OH/SiO_2=0.16$
Seed crystal=0.0% by weight Crystallization was performed by the same method as in Example C-1 except that the raw-material composition prepared above was used. The resulting product was a single-phase CHA-type zeolite and had an $I_{1000}/I_{600}$ of 0.10.

Table 14 shows main compositions of the raw-material compositions of the Comparative Examples, and Table 15 shows the products.

TABLE 14

| | Raw-material composition | | | | | | | | |
|---|---|---|---|---|---|---|---|---|---|
| | $SiO_2/$ $Al_2O_3$ | $Na/$ $SiO_2$ | $K/$ $SiO_2$ | $TMAdCl/$ $SiO_2$ | $TMAdOH/$ $SiO_2$ | $OSDA/$ $SiO_2$ | Seed crystal (%) | $H_2O/$ $SiO_2$ | $OH/$ $SiO_2$ |
| Comparative Example C-6 | 18.3 | 0.040 | 0.110 | 0.070 | 0.010 | 0.080 | 0.0 | 15.0 | 0.16 |
| Comparative Example C-7 | 24.6 | 0.040 | 0.080 | 0.040 | 0.040 | 0.080 | 0.0 | 15.0 | 0.16 |
| Comparative Example C-8 | 40.0 | 0.060 | 0.040 | 0.020 | 0.060 | 0.080 | 0.0 | 15.0 | 0.16 |

TABLE 15

| | Product | | | | |
|---|---|---|---|---|---|
| | Crystal phase | CHA crystallinity (%) | $SiO_2/Al_2O_3$ | Si yield (%) | Ratio SiOH/Si ($\times 10^{-2}$) |
| Comparative Example C-6 | CHA | 108 | 18.3 | 100 | 0.58 |
| Comparative Example C-7 | CHA | 100 | 23.9 | 97 | 1.40 |
| Comparative Example C-8 | CHA | 108 | 35.6 | 89 | 1.68 |

CHA-type zeolites were crystalized by using TMAd salts alone as the OSDA in these Comparative Examples. However, the CHA-type zeolites each had an $I_{1000}/I_{600}$ of lower than 0.30, showing that heat resistance of the CHA-type zeolites in the Comparative Examples were lower than that of the CHA-type zeolites of Examples. Regarding the CHA-type zeolites of Example C-2 and Comparative Example C-7, which have substantially the same $SiO_2/Al_2O_3$, $I_{1000}/I_{600}$ of the CHA-type zeolite of Example C-2 is 0.59, whereas $I_{1000}/I_{600}$ of the CHA-type zeolite of Comparative Example C-7 is 0.24. The CHA-type zeolite according to the present invention was found to have significantly higher heat resistance than CHA-type zeolites obtained from raw-material compositions containing TMAd salts alone as the OSDA.

The entire contents of the specification, claims, drawings, and abstract of Japanese Patent Application No. 2016-102181 filed on May 23, 2016 are cited herein and incorporated as a disclosure of the specification of the present invention.

The invention claimed is:

1. A CHA-type zeolite having a molar ratio of silica to alumina of 10.0 or more and less than 20.0 and a molar ratio of silanol groups to silicon of $0.15 \times 10^{-2}$ or more and $0.50 \times 10^{-2}$ or less,
    a molar ratio of silica to alumina of 20.0 or more and 35.0 or less and a molar ratio of silanol groups to silicon of $0.15 \times 10^{-2}$ or more and $1.10 \times 10^{-2}$ or less,
    a molar ratio of silica to alumina of more than 35.0 and 45.0 or less and a molar ratio of silanol groups to silicon of $0.15 \times 10^{-2}$ or more and $1.65 \times 10^{-2}$ or less, or a molar ratio of silica to alumina of more than 45.0 and 55.0 or less and a molar ratio of silanol groups to silicon of $0.15 \times 10^{-2}$ or more and $1.80 \times 10^{-2}$ or less.

2. The CHA-type zeolite according to claim 1, wherein a ratio of an intensity of a powder X-ray diffraction peak corresponding to a 20-1 reflection of the CHA-type zeolite subjected to heat treatment at 1000° C. for 5 hours in air to an intensity of a powder X-ray diffraction peak corresponding to a 20-1 reflection of the CHA-type zeolite subjected to heat treatment at 600° C. for 5 hours in air is 0.30 or more.

3. The CHA-type zeolite according to claim 1, comprising a crystal particle formed by chemical aggregation of primary particles.

4. A method for producing the CHA-type zeolite according to claim 1, comprising crystallizing a composition containing an alumina source, a silica source, an alkali source, water and an N,N,N-dimethylethylcyclohexylammonium salt having a general formula below alone as an organic structure-directing agent, wherein the alkali source contains at least sodium, and a molar ratio of sodium to silica in the composition is more than 0 and 0.095 or less:

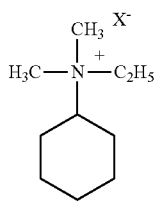

where $X^-$ is a counter anion of an N,N,N-dimethylethylcyclohexylammonium cation.

5. The production method according to claim 4, wherein the N,N,N-dimethylethylcyclohexylammonium salt comprises at least one salt selected from the group consisting of a hydroxide, a chloride, a bromide, an iodide, a carbonic acid monoester salt, a sulfuric acid monoester salt, a nitrate salt and a sulfate salt.

6. The production method according to claim 4, wherein the alkali source contains one or more selected from the group consisting of potassium, rubidium and cesium.

7. The production method according to claim 4, wherein a molar ratio of one or more selected from the group consisting of potassium, rubidium and cesium to silica in the raw-material composition is more than 0 and less than 0.15.

8. The production method according to claim 4, wherein the alumina source and the silica source contain an amorphous aluminosilicate.

9. The production method according to claim 4, wherein a molar ratio of hydroxide ions to silica in the composition is 0.30 or less.

10. A method for producing a CHA-type zeolite, comprising crystallizing a composition containing an alumina source, a silica source, an alkali source, water, an N,N,N-trialkyladamantylammonium salt and an N,N,N-trialkylcyclohexylammonium salt having a general formula below:

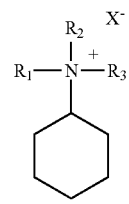

where $R_1$ is an ethyl group, $R_2$ is an alkyl group selected from a methyl group and an ethyl group, $R_3$ is an alkyl group selected from a methyl group and an ethyl group, and $X^-$ is a counter anion of an N,N,N-trialkylcyclohexylammonium cation.

11. The production method according to claim 10, wherein at least one of the N,N,N-trialkylcyclohexylammonium salt or the N,N,N-trialkyladamantylammonium salt is at least one salt selected from the group consisting of a hydroxide, a chloride, a bromide, an iodide, a carbonic acid monoester salt, a sulfuric acid monoester salt, a nitrate salt and a sulfate salt.

12. The production method according to claim 10, wherein a molar ratio of the N,N,N-trialkyladamantylammonium salt to the N,N,N-trialkylcyclohexylammonium salt in the composition is 0.025 or more.

13. The production method according to claim 10, wherein a molar ratio of the N,N,N-trialkyladamantylammonium salt to silica in the composition is 0.005 or more and 0.04 or less.

14. The production method according to claim 10, wherein the alkali source contains one or more selected from the group consisting of potassium, rubidium and cesium.

15. The production method according to claim 10, wherein a molar ratio of one or more selected from the group consisting of potassium, rubidium and cesium to silica in the raw-material composition is more than 0 and less than 0.15.

16. The production method according to claim 10, wherein the N,N,N-trialkyladamantylammonium salt is an N,N,N-trimethyladamantylammonium salt.

17. The production method according to claim 10, wherein the alumina source and the silica source contain an amorphous aluminosilicate.

18. The production method according to claim 10, wherein a molar ratio of hydroxide ions to silica in the composition is 0.30 or less.

19. The production method according to claim 10, wherein the N,N,N-trialkylcyclohexylammonium salt is at least one of an N,N,N-dimethylethylcyclohexylammonium salt or an N,N,N-methyldiethylcyclohexylammonium salt.

20. The production method according to claim 10, wherein the composition has a composition below:
$SiO_2/Al_2O_3$=10 or more and 60 or less
TMAd/DMECHA=0.025 or more and 1.0 or less
$OSDA/SiO_2$=0.06 or more and 0.20 or less
$M/SiO_2$=0.10 or more and 0.30 or less
$OH/SiO_2$=0.05 or more and 0.50 or less
$H_2O/SiO_2$=10.0 or more and 20.0 or less
Seed crystal=0.0% by weight or more and 5.0% by weight or less
where TMAd is an N,N,N-trimethyladamantylammonium salt, DMECHA is an N,N,N-dimethylethylcyclohexylammonium salt, OSDA includes the N,N,N-dimethylethylcyclohexylammonium salt and the N,N,N-trimethyladamantylammonium salt, and M is Na and K.

21. A method for producing a CHA-type zeolite, comprising crystallizing a composition containing an alumina source, a silica source, an alkali source, water and an N,N,N-dimethylethylcyclohexylammonium salt having a general formula 2 below alone as an organic structure-directing agent, wherein the alkali source contains at least sodium, and a molar ratio of sodium to silica in the composition is more than 0 and 0.095 or less, and a molar ratio of silica to alumina in the composition is 60 or less:

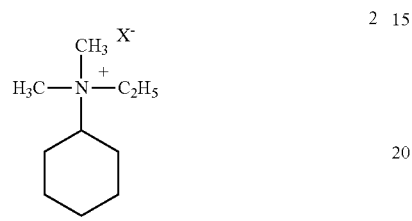

where $X^-$ is a counter anion of an N,N,N-dimethylethylcyclohexylammonium cation.

* * * * *